US012777057B2

(12) United States Patent
Douglas et al.

(10) Patent No.: US 12,777,057 B2
(45) Date of Patent: Oct. 27, 2026

(54) IDENTIFYING ANOMALIES WITHIN STREAMED SECURITY-ALERT DATA BASED ON RETROACTIVELY OBTAINED DATA-TRANSFORMATION INFORMATION

(71) Applicant: Capital One Services, LLC, McLean, VA (US)

(72) Inventors: Lawrence Douglas, McLean, VA (US); Timothy E. Emerson, Ashburn, VA (US); Ashish Bhagare, Cheshire, CT (US)

(73) Assignee: Capital One Services, LLC, McLean, VA (US)

( * ) Notice: Subject to any disclaimer, the term of this patent is extended or adjusted under 35 U.S.C. 154(b) by 90 days.

(21) Appl. No.: 19/019,378

(22) Filed: Jan. 13, 2025

(65) Prior Publication Data

US 2026/0205478 A1 Jul. 16, 2026

(51) Int. Cl.
*H04L 9/40* (2022.01)
*G06F 21/62* (2013.01)

(52) U.S. Cl.
CPC ...... *H04L 63/1425* (2013.01); *G06F 21/6218* (2013.01)

(58) Field of Classification Search
CPC ......................... H04L 63/1425; G06F 21/6218
See application file for complete search history.

(56) References Cited

U.S. PATENT DOCUMENTS

| | | | | |
|---|---|---|---|---|
| 12,563,071 | B1 * | 2/2026 | Skarphedinsson | G06F 16/9024 |
| 12,627,687 | B1 * | 5/2026 | Adamson | H04L 63/1425 |
| 2020/0296124 | A1 * | 9/2020 | Pratt | G06F 21/552 |
| 2023/0396640 | A1 * | 12/2023 | Miller | G06Q 30/0283 |
| 2026/0023633 | A1 * | 1/2026 | Syed | G06F 11/0784 |
| 2026/0057089 | A1 * | 2/2026 | Oztunc | G06F 21/6218 |
| 2026/0075073 | A1 * | 3/2026 | Cameron | H04L 63/1425 |
| 2026/0081940 | A1 * | 3/2026 | Israel | H04L 63/1425 |
| 2026/0106868 | A1 * | 4/2026 | Lakshminarayana | H04L 63/0838 |
| 2026/0135874 | A1 * | 5/2026 | Neystadt | H04L 63/1441 |

* cited by examiner

*Primary Examiner* — Amir Mehrmanesh
*Assistant Examiner* — Aayush Aryal
(74) *Attorney, Agent, or Firm* — Foley & Lardner LLP

(57) ABSTRACT

Methods and systems are described herein for identifying anomalies within streamed event-based time-series data based on retroactively captured data lineage information. For example, the system may receive a request to identify an anomaly associated with a security-event-based time-series. The system may obtain the security-event-based time-series comprising a set of security-alerts further comprising security-alert data. Then the system may store the security-alert data for each security-alert in a database according to a schema. The system may then populate, based on the schema, a set of predefined prompts sections with the security-alert data of the set of security-alerts. The system may then identify the anomaly associated with the security-event-based time-series based on a summary generated by an artificial intelligence model using the set of predefined prompts. The system may then transmit a second notification comprising an indication of the identified anomaly to a user device associated with the user.

20 Claims, 5 Drawing Sheets

IDENTIFYING ANOMALIES WITHIN STREAMED SECURITY-ALERT DATA BASED ON RETROACTIVELY OBTAINED DATA-TRANSFORMATION INFORMATION

BACKGROUND

In recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence may rely on large amounts of high-quality data. The process for obtaining this data and ensuring it is high-quality can be complex and time-consuming. Additionally, data that is obtained may need to be categorized and labeled accurately, which can be difficult, time-consuming and a manual task. Second, despite the mainstream popularity of artificial intelligence, practical implementations of artificial intelligence may require specialized knowledge to design, program, and integrate artificial intelligence-based solutions, which can limit the amount of people and resources available to create these practical implementations. Finally, results based on artificial intelligence can be difficult to review as the process by which the results are made may be unknown or obscured. This obscurity can create hurdles for identifying errors in the results, as well as improving the models providing the results. These technical problems may present an inherent problem with attempting to use an artificial intelligence-based solution in identifying anomalies within streamed time-series data.

SUMMARY

Methods and systems are described herein for novel uses and/or improvements to artificial intelligence applications. As one example, methods and systems are described herein for identifying anomalies within streamed security-alert data based on retroactively obtained data transformation information.

As dataset sizes continue to increase and become more complex, identifying anomalies within the data becomes more difficult. In particular, in the context of data streams, or commonly known as "streaming data," the amount of data that a computing system must ingest and analyze increases every second. The sheer amount of data presents a problem when attempting to identify anomalous behavior as there is a large amount of data a computing system must parse through. Furthermore, as each dataset may be associated with a particular domain, each having its own context, what constitutes an anomaly in one domain may be different within another domain.

Existing systems may attempt to process raw data (e.g., the values of the data itself without any pre-processing) to identify patterns or learn new relationships within the data. For example, such systems may employ one or more unsupervised machine learning models to learn these patterns/relationships from the raw data itself. While employing such unsupervised machine learning models to identify meaningful patterns within the raw data may be useful to form a basis as to what is "normal" among the data, due to the nature of these machine learning models generalizing patterns within the data, such models are unsuited to identify anomalous behavior within the data as the raw data may include the anomalous behavior itself, thus being generalized by the model as "normal" data.

To overcome this, existing systems may utilize supervised machine learning models that are trained on a set of labeled training data, where the training data is labeled with tags indicating anomalous behavior within the dataset. However, in the context of streaming data, due to the sheer amount of data that is obtained in real-time, it is infeasible to manually label and analyze the streamed data to serve as a basis for training a supervised machine learning model to identify anomalies. While existing systems may sample the streaming data, manually label the data, and then train a supervised machine learning model on such data to identify anomalies, such data may become out of date. For instance, what constituted an anomaly in the past may not be an anomaly with respect to the current time or future. Lastly, due to this amount of data, a large amount of time must be dedicated to parsing through the data to identify anomalous behavior.

The amount of time to identify the anomalous behavior is amplified when the data comes in various data types and each data type contains different information. Existing systems may attempt to employ one or more unsupervised machine learning models, where each unsupervised machine learning model is trained to parse through data of a specific data type to identify key information associated with the received data. The key information may then be inputted to another unsupervised machine learning model to identify any anomalous behavior. In other existing systems, one unsupervised machine learning model may be trained to identify the data type, determine the key information based on the identified data type, and then identify any anomalous behavior. Both of these existing methods increase the amount of time it takes to identify anomalous behavior due to the added steps of identifying the data type and then parsing through the data to determine key information. This added time is detrimental to scenarios where quickly identifying anomalous behaviors is necessary to prevent damages to the parties involved with the anomalous behavior. Additionally, by further employing these specifically-trained models, the system wastes valuable computational resources (e.g., computer memory and computer processing resources) required to train each of these models.

To overcome the technical deficiencies of existing systems, the system may identify anomalies within streamed security-alert data based on retroactively obtained data-transformation information. For example, the system may retroactively capture lineage information (e.g., data-transformation information) of an event-based time-series, according to a standardized schema, and provide event information according to the standardized schema to an artificial intelligence model to identify an anomaly within the event-based time-series. By retroactively-capturing (e.g., storing) the data lineage of the time-series in the standardized schema, the system may filter out unnecessary information that may convolute the underlying context to which anomalous behavior may be born—thereby enabling an artificial intelligence model to accurately identify anomalous behavior.

For instance, contrary to existing systems that are susceptible to the conventional thinking of "the more data, the better," the system may leverage the standardized schema to include a subset of factors that describe a datapoint (e.g., a security alert, a security event, an event) of the streamed security-alert data as opposed to using all available security-event-related information of security-events of the streamed security-alert data. For example, in the context monitoring one or more computing devices/systems for security anomalies, the system may receive streamed security-event data, which may form a time-series (e.g., an event-based time-series) for each security event that occurs on the computing device or system. However, due to the wide variety and the large amount of information that may be included in one or more security-alerts (e.g., a user logging in, accessing a resource, opening a document, accessing privileged data storage drives, etc.), characteristics or other factors indicative of an anomaly may be convoluted as some events may be within acceptable, non-malicious use of the computing device and/or computing system. To overcome this, the system may extract key factors from the security event data to filter out or otherwise disambiguate events that are indicative of a security anomaly, and store such information in a database according to a schema for more efficient retrieval.

Such factors may be predetermined as defined in the standardized schema that includes the (i) timestamps associated with an security-event, (ii) a hash ID indicating a transformation of data (e.g., rule set) that was applied to the data at the time recorded, (iii) an origin state of the data, or (iv) a transformed state of the data. By doing so, the system reduces the amount of data required to be stored by the system, while also preventing convolution of anomalous characteristics present within event-data of the event-based time-series. Moreover, capturing the timestamps, hash ID, origin state, and transformed state, the system is enabled to identify security anomalies more accurately. For instance, the hash ID may indicate a rule set (e.g., one or more security mitigation actions, updating of permissions, revocations, acceptances, etc.) that is applied to, or in association with the origin state of the data (e.g., the original security alert). By leveraging knowledge of the hash ID, an artificial intelligence model may determine whether the rule set applied to the origin state of the data has been correctly applied to obtain the transformed state of the data (e.g., a resolution to the security alert). In other words, the system may leverage this information to determine whether an anomaly has occurred with respect to one or more events of the event-based time-series based on (i) the rule set and (ii) the transformed state of the data—thereby overcoming the need for specifically-trained machine learning models to identify key information that may indicate anomalous behavior.

Additionally, the system may be triggered to identify an anomaly associated with an event-based time series based on a received request. For example, given the large volume of data that may be received by computing systems accepting streamed data (e.g., streamed security-event data, streamed event data, streamed-time series, etc.), to reduce utilization of computational resources (e.g., computer memory, computer processing cycles, etc.) associated with identifying anomalies, the system may retroactively capture data lineage associated with the security-event-based time series based on a request to identify an anomaly. For example, in cases where the need to identify security-anomalies are "rare," or need additional information to properly determine whether an anomaly exists, existing systems that attempt to identify anomalies in real time may waste valuable computational resources that could otherwise be used for other tasks. As such, the system may identify requested anomalies based on being triggered by a request (e.g., a user request) to preserve such computational resources.

Using the standardized schema, the system may obtain contextual information of each event (e.g., security-alert) and provide it to an artificial intelligence model to identify one or more anomalies. For example, the artificial intelligence model may be a Large Language Model trained to identify security-anomalies (or other anomalies) within the security-event-based time-series, based on the standardized schema, by analyzing the contextual security information provided by the standardized schema (e.g., the timestamps, hash ID, origin state of the data, and transformed state of the data). For instance, as the data lineage information is stored according to the standardized schema, the system not only reduces data retrieval time, but also provides the labels indicating what information is stored. That is, the system may provide automatically labeled information to the artificial intelligence model by retrieving the data lineage information for the event-based time series based on the schema, thereby preventing the need for manual labeling of such security-event-based time-series data. Using this information, the artificial intelligence model may generate a summary that summarizes the security alerts and other security events that have occurred within the security-event-based time-series that includes one or more anomalies. Upon identifying a security anomaly, the system may generate a notification. For example, the notification includes an identified anomaly discovered within the security-event-based time-series in order to provide users or other cybersecurity analysts with an indication that anomalous behavior has occurred that may be indicative of a cybersecurity attack. By doing so, the system may enhance detection of cybersecurity attacks while also reducing the amount of computer memory and processing power conventionally utilized to monitor such information in real time.

In some aspects, methods and systems for identifying anomalies within streamed security-alert data based on retroactively obtained data-transformation information is provided. For example, the system may receive a first notification indicating a request to identify an anomaly associated with an security-event-based time-series. The system may obtain the security-event-based time-series, based on an account identifier associated with a user, wherein the security-event-based time-series comprises a set of security-alerts, wherein each security-alert comprises security-alert data. The system may store the security-alert data for each security-alert of the set of security-alerts in a database according to a schema defining (i) an identifier indicative of a transformation applied to a first value associated with the security-alert, (ii) the first value indicating a state of the security-alert at a first time, and (iii) a second value indicating the state of the security-alert at a second time. The system may populate, based on the schema, a set of predefined prompts that each comprise a set of sections, each section comprising a set of data fields, wherein the set of data fields correspond respectively to (i) the identifier, (ii) the first value, (iii) the second value, and (iv) a timestamp associated with a respective security-alert of the set of security-alerts. The system may identify the anomaly associated with the security-event-based time-series based on a summary generated by an artificial intelligence model, by providing the set of predefined prompts to the artificial intelligence model, wherein the artificial intelligence model is trained to generate summaries of security-alerts using information included in predefined prompt. The system may transmit a second notification comprising an indication of the identified anomaly to a user device associated with the user.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
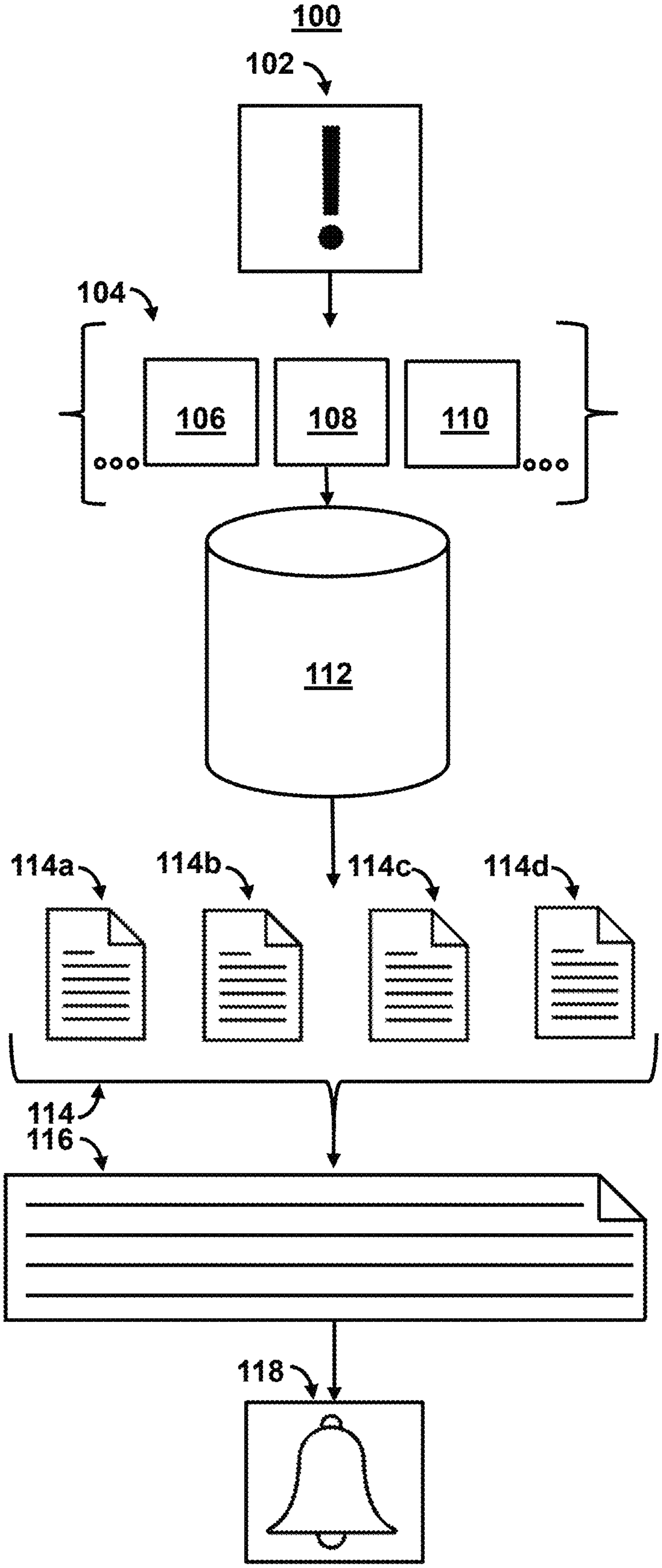
FIG. 1 shows an illustrative diagram for detecting anomalies within time-series data, in accordance with one or more embodiments.
Figure 3:
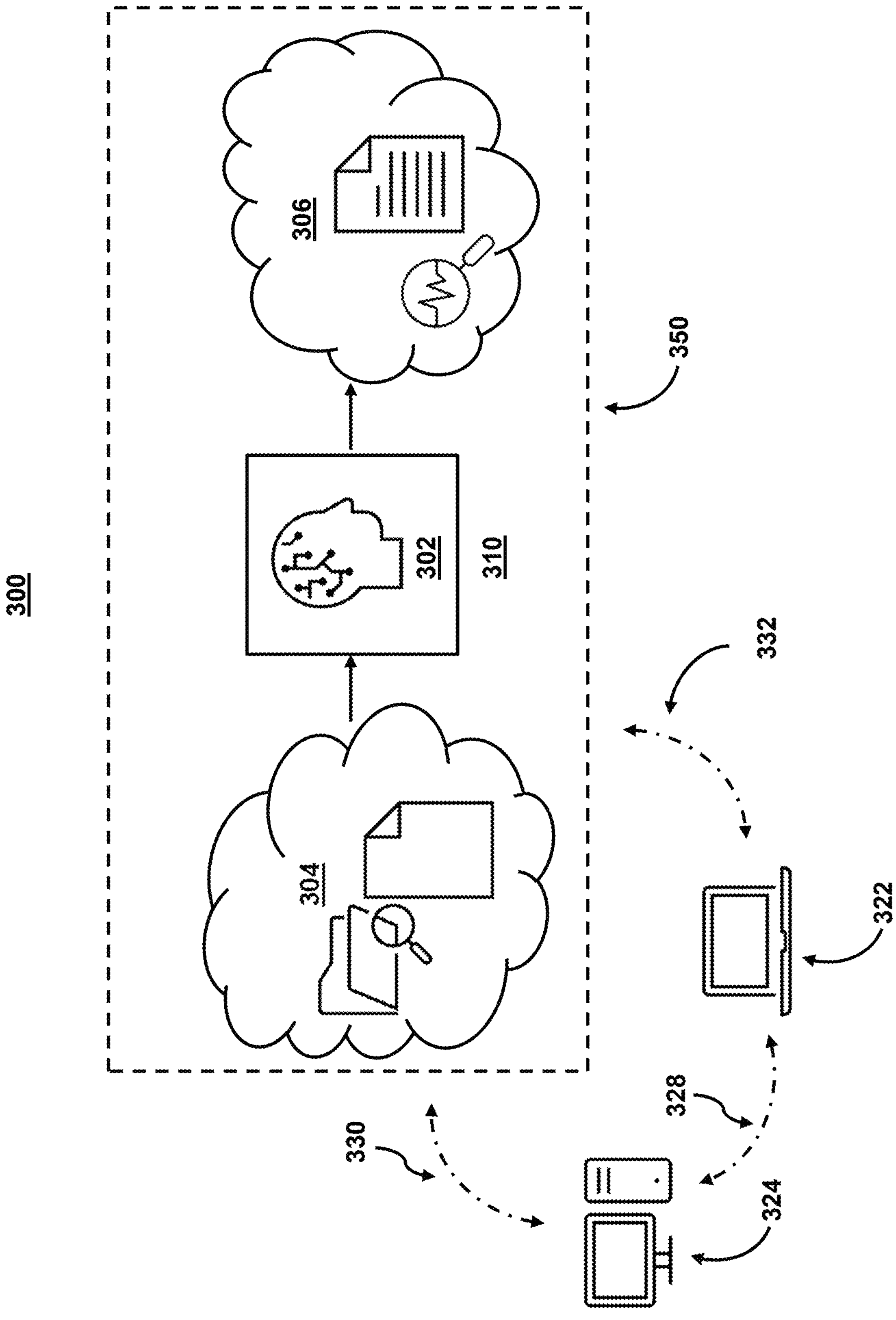
FIG. 3 shows illustrative components for a system used identifying anomalies based on lineage information of a time-series in accordance with one or more embodiments.

FIG. 1 shows an illustrative diagram for detecting anomalies within time-series data, in accordance with one or more embodiments. For example, FIG. 1 shows an illustrative flow diagram for retroactively capturing data lineage of a time-series dataset to identify one or more anomalies associated with the time-series. For instance, diagram 100 may represent an illustrative flow diagram showing retroactively capturing data lineage of a time-series data set to identify one or more anomalies associated with the time-series. One or more of the components or operations associated with such components may be performed by one or more components of system 300 (FIG. 3).

For example, the system may receive a first notification 102 to identify an anomaly associated with a time-series. For example, first notification 102 may be provided by a user device associated with a user. First notification 102 may indicate a request to identify an anomaly associated with a time-series dataset. The time-series dataset may be a time-series that is related to an account of the user. For example, the system may store user account activity as a time series such that the user's account activity is provided with at least a time stamp indicating the time/date at which an event occurred, and other event related information (e.g., an action that the user has performed, an action that is related to another action that the user has performed, etc.). The time-series data set may be a streamed time-series data set. For example, as the user performs one or more actions, each action may be received (and stored) by the system in real time (or near real time) based on the user's performance of such actions. By receiving a notification to identify an anomaly associated with a streamed time-series, the system may reduce utilization of computational resources (e.g., computer memory, computer processing cycles, etc.) as opposed to actively monitoring the streamed time-series.

In some embodiments, the system may be configured to identify an anomaly associated with a time-series based on a condition. For example, as opposed to receiving first notification 102 indicating a request to identify an anomaly associated with the time-series dataset, the system may monitor for one or more conditions and when one or more of those conditions are satisfied, may trigger the system to identify an anomaly associated with the time-series dataset. For example, the conditions may be an identification of a particular user identifier associated with a user, a predetermined time threshold, a threshold amount of data associated with the time-series dataset is received, detection of a particular action associated with an event of the streamed time-series dataset, or other conditions. For instance, the system may be triggered to identify an anomaly associated with the time-series dataset when the time-series dataset is associated with a user-account identifier matching a targeted user account identifier. As another example, the system may be triggered to identify an anomaly with the time-series dataset every minute, 2 minutes, 3 minutes, hour, day, month, or other threshold time period. The system may also be triggered to identify an anomaly with the time-series dataset based on a threshold amount of data being received respective to the time-series dataset. For example, the system may determine that the respective time-series is being received at a rate of 30 bps (when the threshold, or normal data rate is 2 bps), which may indicate suspicious activity due to the number of events occurring (and hence, being received). As yet another example, the system may monitor for whether a given event of the time-series occurs that is indicative of suspicious behavior. For instance, the system may compare each event of the streamed time-series as received to a stored list of targeted events (e.g., events associated with a given value amount, events occurring within a targeted time period, events associated with a given country, etc.) and upon a match between an event of the streamed-time series and a targeted event, the system may be triggered to identify an anomaly associated with the time-series dataset. By doing so, the system may perform active monitoring of the streamed time-series to determine whether to trigger further processes of the system related to identifying one or more anomalies. In this way, the system may conserve computational resources associated with identifying such anomalies by leveraging less resource intensive processes providing a first check on the time-series data as it is received (e.g., to determine whether to execute anomaly identification processes as described below).

The system may store event data for each event in a set of events associated with the time-series in a database according to a schema. For example, the system may obtain the time-series dataset based on an account identifier associated with the user. For example, first notification 102 may include an account identifier associated with the user. The system may extract the account identifier from the notification to obtain the time-series dataset (e.g., from a database) using the account identifier. As described above, the time-series dataset may include a set of events (e.g., set of events 104, etc.). The system may parse through each event of the set of events to extract event data associated with each event (e.g., first event 106, second event 108, and third event 110, etc.). The system may then store the extracted event data in database 112 according to the schema. For example, the system may store a portion of the extracted event data in database 112 according to the schema, this may allow the system to filter out unnecessary information included in the event data to enable the system to more accurately identify anomalous behavior associated with the time-series.

The system may populate a set of prompts using the schema. For example, the system may utilize the schema from database 112 to generate the set of predefined prompts 114, which may include one or more predefined prompts (e.g., first prompt 114*a*, second prompt 114*b*, third prompt 114*c*, fourth prompt 114*d*, etc.). For instance, the system may access database 112 storing the portion of the extracted event data by using the schema. By doing so, the system may reduce data retrieval times by using the schema to retrieve the portion of extracted event data. For example, the system may retrieve the portion of extracted event data to be used in populating the set of predefined prompts 114*a*-114*c*. The system may then utilize the set of predefined prompts to generate a summary 116 to identify the anomaly associated with the time-series data. For example, the system may provide the set of predefined prompts including the extracted event data to an artificial intelligence (AI) model (e.g., a neural network, a natural language processing model, a Large Language Model (LLM), etc.) to generate a summary of the time-series dataset. For example, where the artificial intelligence model is an LLM, the system may provide the set of predefined prompts to the LLM to generate a summary of the time-series dataset. The summary of the time-series dataset may include one or more anomalies associated with the time-series dataset. In some embodiments, upon generating the summary 116, the system may generate a second notification 118. For example, the second notification 118 may include the summary 116. Second notification 118 may be transmitted to a user device associated with the user (e.g., who transmitted first notification 102). For example, the system may transmit the second notification 118 to the user's device to provide the user with one or more identified anomalies associated with the time-series dataset.

As described herein, "time-series data" may include a sequence of data points that occur in successive order over some period of time. In some embodiments, time-series data may be contrasted with cross-sectional data, which captures a point-in-time. A time series can be taken on any variable that changes over time. The system may use a time series to track the variable (e.g., state, value, amount, price,) of an asset (e.g., item, security, event) over time. Time-series data may include event-based time-series data. For example, as described herein, event-based time-series data may include a series of discrete events occurring over time. In some embodiments, each event of the series of discrete events may include event information. For example, the event information may include a timestamp, one or more attributes, and an event indicator, or other information. The one or more attributes may include one or more values associated with the event, where each value of the one or more values is associated with a specific time.

For example, in a cybersecurity monitoring embodiment, the event-based time-series may be a security-event-based time-series that comprises a set of security alerts (e.g., generated by one or more computing devices, computing systems, user devices, etc.). For example, each security alert may be considered an event as the respective computing device/system tracks or monitors actions performed on the computing device/system. Each security alert of the set of security alerts may include security-alert data which may indicate one or more timestamps at which the security-alert (e.g., security event) occurred, a status of the computing device, a permission impacted by the event, one or more values (e.g., a level of criticality, an amount of computer processing power being utilized at the time of the event, an amount of network data packets being sent by the system at a given time, an origin state of the security alert (e.g., not mitigated), a transformed state of the security alert etc.), one or more rule sets applied to the security event (e.g., removing of permissions, blacklisting IP addresses, revocation of access to a resource, or other security mitigation actions) that mitigate the security event (or otherwise protect the computing device) to achieve a transformed state of the security alert (mitigated), or other information.

In a financial services embodiment, the one or more values may be associated with financial account usage, for example, a transaction amount, cardholder information (e.g., a card number, a card expiration date, etc.), account information (e.g., account number, account name, etc.), a balance, a payment amount, a credit limit. In some embodiments, the event indicator may indicate an event type, which may be a name for the event type or a numerical representation, or hash number, of the event type. For example, if one event of the series of discrete is a transaction, the event indicator may say "transaction" or may give a numerical representation indicating the event was a transaction. In some embodiments, the event-based time-series data may be associated with an anomaly. In some embodiments, the event-based time-series data may be associated with a user account, such as a user account associated with the financial account usage detailed in the series of discrete events. The event-based time-series data may be stored in a first database where it may be accessed/obtained/retrieved by the system to be stored in a second database according to a schema.

As described herein, a schema may be a structured framework that defines how data is organized within a database and acts as a blueprint of a database's structure. In disclosed embodiments, a schema may include information indicating how data is stored, related, or otherwise managed. For example, a schema may include information regarding tables of a database, fields or columns of properties in table(s), relationships between tables/data fields of the tables (e.g., primary keys, foreign keys, etc.), constraints or other rules applied to data (e.g., restrictions, uniqueness), indexes, views, or other information. The schema may be used to store event-based time-series data. For example, the schema may be used to store timestamps, attributes, event indicators, or other event-related information to improve data retrieval time. The schema may then be used to identify an anomaly associated with the event-based time-series data.

As described herein, an anomaly may refer to an unexpected event, value, or deviation from a pattern. An anomaly may comprise database anomalies. For example, database anomalies may include insertion anomalies (e.g., data is failed to be added), update anomalies (e.g., partial data is stored, multiple copies/versions of data, etc.), deletion anomalies (e.g., unintended deletion, accidental deletion, deletion of data based on the deletion of other data), or other database-related anomalies. An anomaly can comprise event-related anomalies. For example, event-related anomalies may be incorrect event information associated with one or more events of the series of discrete events. For example, one event of the series of discrete events may include a time stamp of 2:00 P.M. when the event actually occurred at 3:00 P.M.

In a cybersecurity monitoring embodiment, an anomaly may comprise one or more security anomalies associated with a computing device/system. For example, while one or more rule sets (e.g., cybersecurity mitigation actions) may be applied to a computing system in response to receiving one or more security alerts, the system may identify whether an anomaly exists. For example, while the rule set may have been applied to mitigate the security alert, there may exist a time difference in which the security event was actually mitigated (which may indicate improper use, a man-in-the-middle attack, a malicious user preventing the mitigation action from being applied on the system, or other cybersecurity attack). As such, the system may identify such an anomaly to bring it to the attention of one or more computer administrators to help diagnose or otherwise protect the respective computing system/device.

In other embodiments, an anomaly may comprise an unusual behavior for the user account associated with the event-based time-series data. This may be accomplished by the system comparing the event-based time-series data to average values associated with the user account. For example, the user-account may not typically spend more than $150.00 in a day, while one event of the series of discrete events is a transaction for $232.52, a comparison of these two values may lead the system to transmit a notification that the transaction $232.52 may be an anomaly. In another embodiment, the anomaly may be a mistake in the generation of the schema, or in generating the summary. For example, the event-based time-series may indicate for one event of the series of discretized events the transaction amount was $83.00 while the schema indicates a transaction amount of $75.00, this may lead the system to indicate an anomaly in the schema.

As described herein, prompts may be a template input that includes at least one instruction to be provided as input to an artificial intelligence (AI) model. For example, a prompt may include information (e.g., text, images, audio, video, etc.) that may be provided to an AI model to cause the artificial intelligence model to generate an output based on the prompt. In disclosed embodiments, a prompt may be a predefined prompt. For example, the predefined prompt may include textual data indicating an instruction (e.g., identify an anomaly, summarize this time-series, etc.) that causes the AI model to generate an output. As another example, a predefined prompt may be a textual representation of the event-based time-series data that can be processed by an artificial intelligence (AI) model. In some embodiments, the set of predefined prompts may comprise one or more instructional prompt, question prompt, contextual prompt, or another prompt structure. An instructional prompt may provide clear instructions or commands for the AI model to follow to generate the summaries of events based on the event-based time-series data. A question prompt may ask the AI model to generate the summaries of events based on the event-based time-series data. A Contextual prompt may provide the event-based time series data as background information and the AI model may be trained to generate the summaries of events based on receiving the event-based time series data as background information.

In some embodiments, each prompt of the set of predefined prompts may be configured for events with specific characteristics. Each prompt of the set of predefined prompts may be associated with events including specific attributes or certain event indicators. For example, a first prompt of the set of predefined prompts may be configured for events with transaction event indicators, while a second prompt of the set of predefined prompts may be configured for events with payment event indicators. In some embodiments, the system may select for a first event of the set of discretized events a prompt from the set of predefined prompts based on a comparison of the indicator type of the prompt with the indicator type of the first event. For example, if the first event includes a transaction indicator type, a prompt associated with a transaction indicator type may be selected.

In some embodiments, each prompt of the set of predefined prompts may include one or more sections. Each section of the one or more sections may include one or more data fields, each data field of the one or more data fields including a set of values. The system may populate the data fields with the timestamp, one or more attributes, and the event indicator of each event of the series of discrete events. For example, the system may populate all the events of the discrete events in a first section of the one or more sections. In other embodiments, the system may assign one event of the discrete event data to one section of the one or more sections, the data fields of each section of the one or more sections may then be populated with the timestamp, one or more attributes, and the event indicator of the one event. For example, a first event may populate the first section and a second event may populate a second section.

Figure 2A:
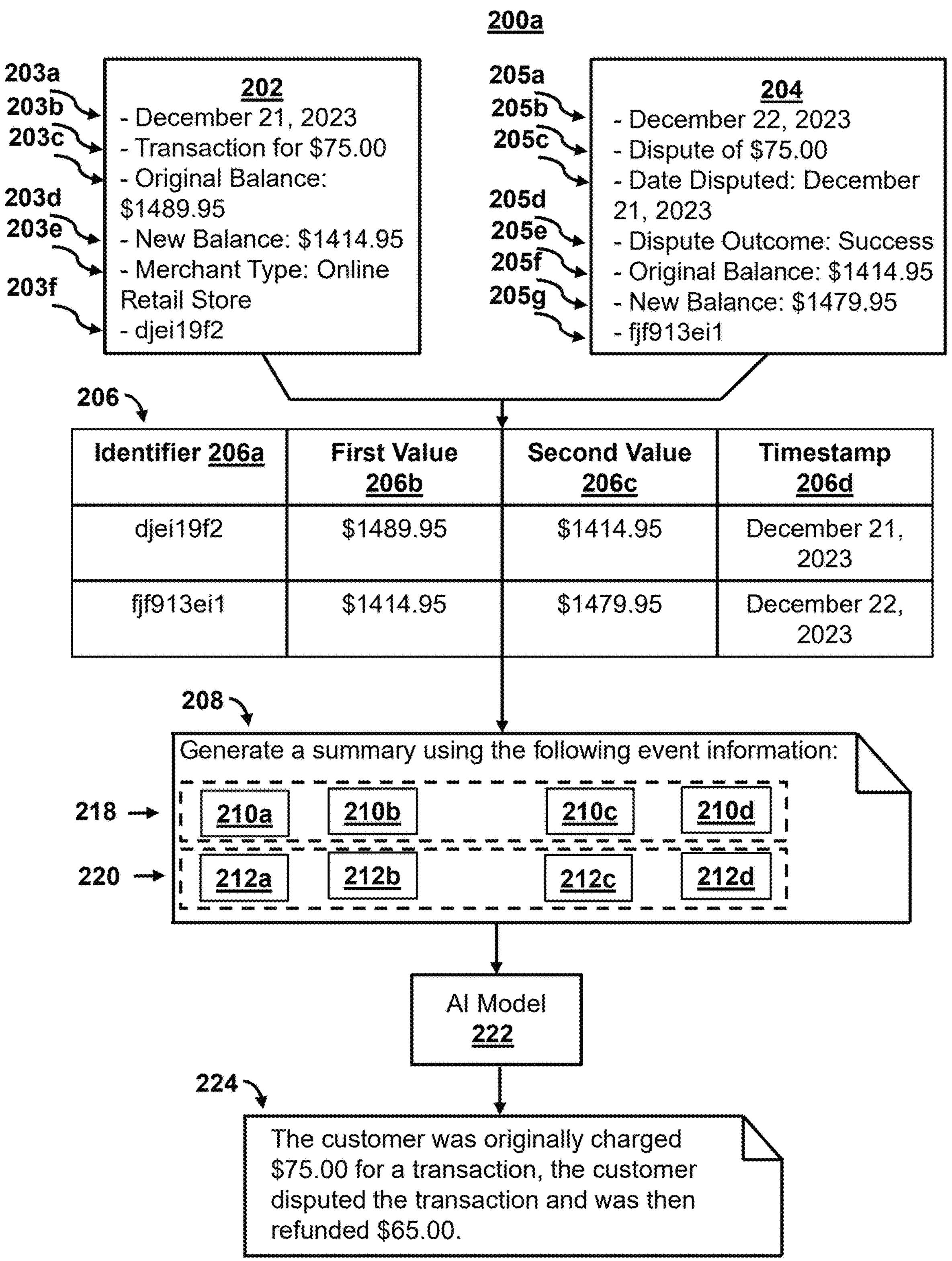
FIGS. 2A-2B shows an illustrative diagram for identifying anomalies based on lineage information of a time-series, in accordance with one or more embodiments.
Figure 2B:
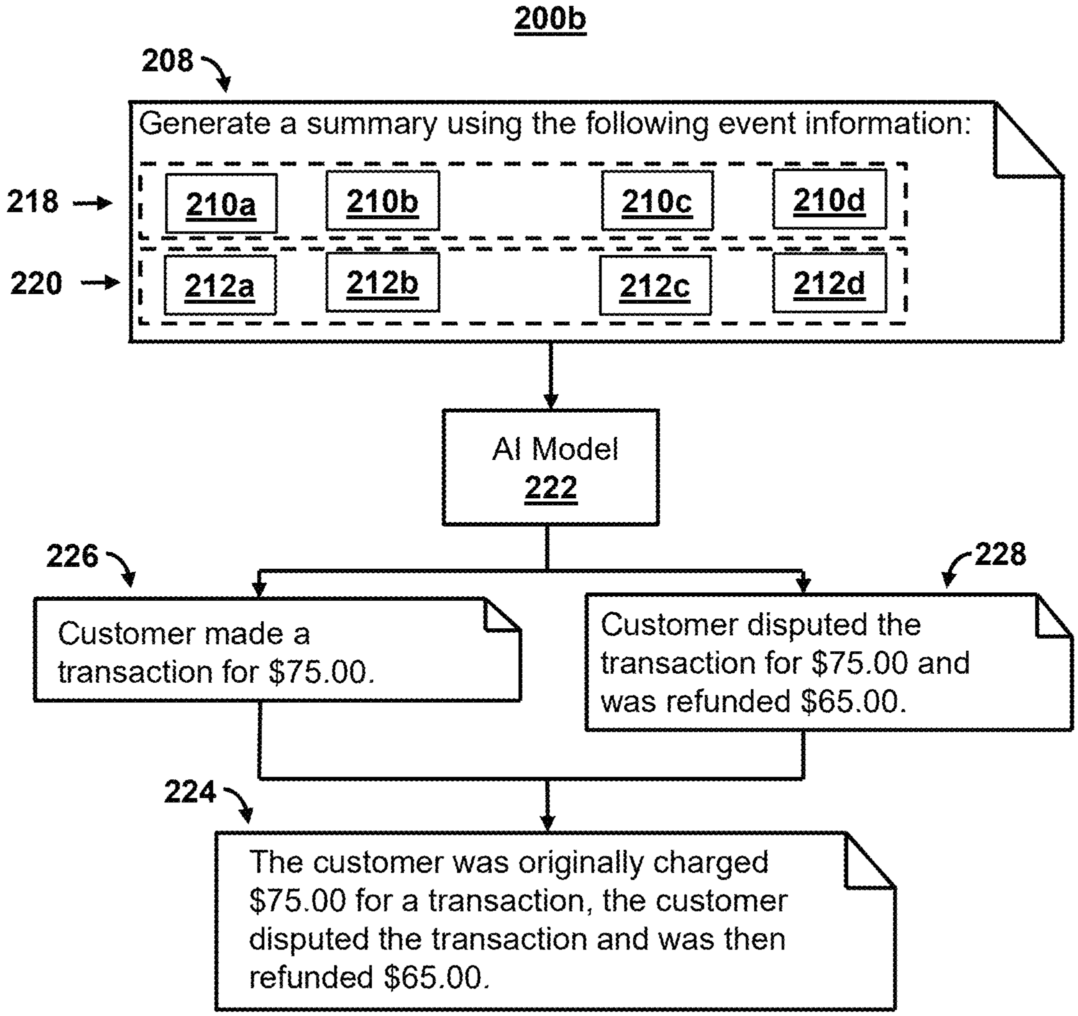

FIGS. 2A-2B shows illustrative diagrams for identifying anomalies based on lineage information of a time-series, in accordance with one or more embodiments. For example, referring to FIG. 2A, system 200*a* illustrates a first event 202 and a second event 204 which may be part of a set of events (e.g., set of events 104, etc.) of a time-series dataset. For example, the time-series dataset may be an event-based time-series. Each event in the set of events may include event data. For example, the first event 202 may include event data 203*a-f* and second event 204 may include event data 205*a-g*, referred to collectively as first event data 203 and second event data 205, respectively. The event data (e.g., first event data 203, second event data 205, etc.) may include an event type (e.g., transaction, dispute, etc.), a timestamp (e.g., a first timestamp 203*a*, a second timestamp 205*a*, etc.), a transaction amount (e.g., a transaction amount 203*b*, etc.), a dispute amount (e.g., a dispute amount 205*b*, etc.), a date being disputed (e.g., a dispute date 205*c*, etc.) an original account balance (e.g., a first original account balance 203*c*, a second original account balance 205*e*, etc.), a new account balance (e.g., a first new account balance 203*d*, a second new account balance 205*f*, etc.), a merchant type (e.g., merchant type 203*e*, etc.), a user account identifier, an identifier (e.g., a first identifier 203*f*, a second identifier 205*g*, etc.), an event status (e.g., a dispute outcome 205*d*, etc.) and/or other event information associated with each event. The merchant type may include an online retail store, a fast-food restaurant, a retail store, or another business type associated with the event.

For example, FIG. 2A illustrates first event data 203 as including first timestamp 203*a* of Dec. 21, 2023, transaction amount 203*b* of $75.00, first original account balance 203*c* of $1489.95, first new account balance 203*d* of $1414.95, merchant type 203*e* of online retail store, and first identifier 203*f* of djei19f2. In another example, FIG. 2A illustrates second event data 205 as including second timestamp 205*a* of Dec. 22, 2023, dispute amount 205*b* of $75.00, dispute date 205*c* of Dec. 21, 2023 (e.g., disputing first event 202), dispute outcome 205*d* of a success, second original account balance 205*e* of $1414.95, second new account balance 205*f* of $1479.95, and second identifier 205*g* of fjf913ei1.

The identifiers (e.g., first identifier 203*f*, second identifier 205*g*, etc.) in the event data may enable the system to identify anomalies more accurately. The identifier may be a hash identifier, a variable identifier, a class identifier, or another identifier type associated with the event data. For example, the identifier may indicate a rule set associated with the event. The rule set may indicate the event type and may, for example, be selected from a set of rule sets. A first rule set of the set of rule sets may indicate a transaction occurred, while a second rule set of the set of rule sets may indicate a dispute occurred. In another example, the first rule set may indicate a transaction occurred at a retail store. As yet another example, the rule set may indicate a set of operations performed in association with the event. For example, to track the data lineage of the event-based time-series, the rule set identifier (e.g., first identifier 203*f*, second identifier 205*g*, etc.) may be included in the event data to indicate what operations were applied to the event data. For instance, the first identifier 203*f* may indicate that a first rule set was applied to the first event that resulted in a first state (e.g., first original account balance 203*c*) of the event being transformed into a transformed state of the event (e.g., first new account balance 203*d*). In such example, the rule set may be adding the first amount (e.g., transaction amount 203*b*) to the first state (e.g., first original account balance 203*c*) of the event to obtain the transformed state (e.g., first new account balance 203*d*) of the event. However, it should be noted that other rule sets and operations may occur which may involve, addition, subtraction, multiplication, division, removal, deletion, nullifying, identifying a type of an event, or other operations that may be applied to an event and/or states of events to result in a transformed state of the event. As such, the identifier may allow for less information to be included in the event data by summarizing part of the event data. For example, the event data may not need to specify the merchant type and the event type because it may be captured by the rule set associated with the identifier. This may allow the system to save on computational resources for having less data fields to process. Furthermore, by using an identifier, the system may generate more accurate summaries of the time-series dataset by being provided with contextual data lineage information as to how states of the time-series have changed with respect to time.

The system may store the event data in a database (e.g., database 112, etc.). The system may extract the event data of the set of events in a first format. For example, the system may extract first event data 203 and second event data 205 from first event 202 and second event 204, respectively. First event data 203 and second event data 205 may be stored in a first format. For example, the first event data 203 and the second event data 205 may be stored in a first format (e.g., an unstructured .txt file, JSON file, JAVA file, or other data format). The system may then parse the event data of the set of events to identify a subset of event data for each event, for example, the identifier, a first value, a second value, and the timestamp. The subset of event data may be preset within the system or, in some embodiments, may be selected by a user. The system may also determine the rule set associated with the identifier. For example, the system may parse through first event data 203 to extract first identifier 203*f*, first original account balance 203*c*, first new account balance 203*d*, and first timestamp 203*a*. The system may then retrieve a schema (e.g., schema 206, etc.) from a schema database. The parsed event data may then be stored in the schema.

In some embodiments, schema 206 may define a structure of a database. For example, the schema 206 may be a relational database schema comprising a table, where the table includes a column associated with each of the extracted data elements and a row for each event. For example, as illustrated by FIG. 2A, schema 206 may include a series of columns such as an identifier column 206*a*, a first value column 206*b*, a second value column 206*c*, and a timestamp column 206*d*. Schema 206 may further include a row associated with first event 202 and second event 204. The system may store the extracted event data of each event in one of the columns. For example, in a first row of schema 206, first identifier 203*f* may be stored under identifier column 206*a*, first original account balance 203*c* may be stored under first value column 206*b*, first new account balance 203*d* may be stored under second value column 206*c*, and first timestamp 203*a* may be stored under timestamp column 206*d*.

In other embodiments, schema 206 may define one or more tables, where each table aligns with a different type of extracted data. For example, identifier column 206*a*, first value column 206*b*, second value column 206*c*, timestamp column 206*d* may be individual tables, each table storing the respective extracted data. In some embodiments, the system may then store the extracted event data within the database according to the schema.

As stated above, the system may then populate, based on schema 206, a set of predefined prompts (e.g., set of predefined prompts 114), each prompt of the set of predefined prompts may include a set of sections, each section including a set of data fields. In some embodiments, a first section of a first prompt may correspond to a first event of the set of events. The system may select a first section of the first prompt, the first section including a first data field corresponding to the identifier, a second data field corresponding to the first value, a third data field corresponding to the second value, and a fourth data field corresponding to a timestamp. The system may then transmit a request to the database for the necessary event data, receive the event data, and then populate the first section of the first prompt by populating: the first data field with the identifier associated with the first event, the second data field with the first value associated with the first event, the third data filed with the second value of the first event, and the fourth data field with the timestamp associated with the first event. FIG. 2A illustrates an example of this embodiment as prompt 208.

Prompt 208 illustrates a first section 218 and a second section 220. First section 218 may be associated with first event 202 and second section 220 may be associated with second event 204. First section 218 may include a first set of data fields 210*a-d*, referred to collectively as first set of data fields 210. Second section 220 may include a second set of data fields 212*a-d*, referred to collectively as second set of data fields 212. First set of data fields 210 and second set of data fields 212 may include a first data field (e.g., first data field 210*a*, first data field 212*a*, etc.) a second data field (e.g., second data field 210*b*, second data field 212*b*, etc.), a third data field (e.g., third data field 210*c*, third data field 212*c*, etc.), and a fourth data field (e.g., fourth data field 210*d*, fourth data field 212*d*, etc.).

The system may populate first set of data fields 210 with the data stored according to schema 206 associated with first event 202. For example, first data field 210*a*, second data field 210*b*, third data field 210*c*, and fourth data field 210*d* may be populated with the event data stored according to schema 206 for first event 202 under identifier column 206*a*, first value column 206*b*, second value column 206*c*, and timestamp column 206*d*, respectively. The system may populate second set of data fields 212 of second section 220 with the data stored according to the schema associated with second event 204. For example, first data field 212*a*, second data field 212*b*, third data field 212*c*, and fourth data field 212*d* may be populated with the event data stored according to schema 206 for second event 204 under identifier column 206*a*, first value column 206*b*, second value column 206*c*, and timestamp column 206*d*, respectively.

In other embodiments, the system may transmit a request to the database to retrieve first identifier 203*f*, first original account balance 203*c*, first new account balance 203*d*, and first timestamp 203*a*. Upon receiving the requested event data, the system may select the first prompt from the set of predefined prompts based on first identifier 203*f*. In some embodiments, each prompt may be associated with a specific identifier and the first prompt will be selected if the associated identifier matches first identifier 203*f*. In other embodiments, each prompt may be associated with a group of identifiers and the first prompt will be selected if first identifier 203*f* is included in the group of identifiers. For example, the system may receive the first identifier 203*f* and prompt 208 may be associated with first identifier 203*f*, causing the system to select prompt 208 from the set of predefined prompts. In these embodiments, the system may determine the rule set associated with the identifier and may populate a fifth data field of the prompt with the rule set.

In another embodiment, a set of data fields of a first section of the first prompt may be populated with first event data 203 and a set of data fields of a first section of a second prompt may be populated with second event data 205.

Populating one or more prompts of the set of predefined prompts may allow the system to filter out event data not essential for identifying anomalies which may reduce the risk of false positives. This may also result in faster training times of the AI model used to identify the data anomalies, as well as reducing the complexity and energy consumption of the AI model.

As stated above, upon populating the set of predefined prompts, the system may identify the anomaly associated with the event-based time-series. The anomaly may be identified based on a summary generated by an artificial intelligence (AI) model 222 responsive to providing the set of predefined prompts to AI model 222. For example, the system may transmit prompt 208 to AI model 222 to generate summary 224. As discussed above, to provide contextual data lineage information to AI model 222, prompt 208 may include (i) an identifier indicative of a transformation applied to a first value associated with the event (e.g., first identifier 203*f*), (ii) the first value indicating the state of the event at a first time (e.g., first original account balance 203*c*), (iii) a second value indicating the state of the event at a second time (e.g., first new account balance 203*d*), and/or (iv) a timestamp associated with the event(s) (e.g., first timestamp 203*a*). By doing so, the system may reduce the amount of information AI model 222 needs to process—thereby reducing AI model prediction latency while maintaining accuracy. In some embodiments, summary 224 may include additional information generated by AI model 222. For example, AI model 222 may perform mathematical operations using the event data included in the prompt. This may include the amount of time between two or more events, the change in balance in the user account, or other information that may be useful for identifying the anomaly. For example, summary 224 may state, "The customer was originally charged $75.00 for a transaction, the customer disputed the transaction and was then refunded $65.00." In another example, the system may perform a mathematical operation and summary 224 may state, "The customer was originally charged $75.00 for a transaction, the customer disputed the transaction and was then refunded $65.00, which is $10.00 less than the disputed charge." The system may then identify an anomaly associated with summary 224 such as the customer not being refunded the full $75.00 involved in the transaction.

In some embodiments, summary 224 may be provided to a second AI model trained to identify anomalous events associated with the event-based time-series. The system may then receive the identified anomaly from the second AI model.

AI model 222 and/or the second AI model may include, for example and without limitation, one or more language models, LLMs, attention-based neural networks, transformer-based neural networks, generative pretrained transformer (GPT) models, bidirectional encoder representations from transformers (BERT) models, encoder/decoder models, sequence to sequence models, autoencoder models, generative adversarial networks (GANs), convolutional neural networks (CNNs), recurrent neural networks (RNNs), diffusion models (e.g., denoising diffusion probabilistic models (DDPMs)), or various combinations thereof.

For example, AI model 222 and/or the second AI model may include at least one GPT model. The GPT model can receive an input sequence and can parse the input sequence to determine a sequence of tokens (e.g., words or other semantic units of the input sequence, such as by using Byte Pair Encoding tokenization). The GPT model can include or be coupled with a vocabulary of tokens, which can be represented as a one-hot encoding vector, where each token of the vocabulary has a corresponding index in the encoding vector; as such, the GPT model can convert the input sequence into a modified input sequence, such as by applying an embedding matrix to the token tokens of the input sequence (e.g., using a neural network embedding function), and/or applying positional encoding (e.g., sin-cosine positional encoding) to the tokens of the input sequence. The GPT model can process the modified input sequence to determine a next token in the sequence (e.g., to append to the end of the sequence), such as by determining probability scores indicating the likelihood of one or more candidate tokens being the next token, and selecting the next token according to the probability scores (e.g., selecting the candidate token having the highest probability scores as the next token). For example, the GPT model can apply various attention and/or transformer based operations or networks to the modified input sequence to identify relationships between tokens for detecting the next token to form the output sequence.

In some implementations, AI model 222 and/or the second AI model may be configured using various unsupervised and/or supervised training routines (e.g., supervised, semi-supervised, etc.). AI model 222 and/or the second AI model may be configured using training data from various domain-agnostic and/or domain-specific data sources, including, but not limited to, various forms of text, speech, audio, image, and/or video data, or various combinations thereof. The training data can include a plurality of training data elements (e.g., training data instances). Each training data element can be arranged in structured or unstructured formats; for example, the training data element can include an example output mapped to an example input, such as a query representing a service request or one or more portions of a service request, and a response representing data provided responsive to the query. The training data can include data that is not separated into input and output subsets (e.g., for configuring AI model 222 and/or the second AI model to perform clustering, classification, or other unsupervised ML operations). The training data can include human-labeled information, including but not limited to feedback regarding outputs of the system. This may allow the system to generate more human-like outputs.

For example, AI model 222 and/or the second AI model may be trained with training data including previously obtained event data, previously generated set of prompts, and/or previously identified anomalies associated with an event-based time series. One or more loss functions (e.g., mean absolute error, mean squared error, root mean squared error, etc.) may be utilized during training to set the weights and/or biases of the AI model 222 and/or the second AI model. Multiple iterations of training may be performed for AI model 222 and/or the second AI model until a predetermined accuracy and/or precision is achieved by the models to ensure accurate anomaly identification.

In some embodiments, the system may perform natural language processing (NLP) on the summary generated by AI model 222. The NLP may involve analyzing the syntax and grammar of the summary to develop an understanding of what the summary says. The NLP optimization process may further include performing mathematical operations using numeric values present in the summary. For example, the summary may state, "The customer was originally charged $75.00 for a transaction, the customer disputed the transaction and was then refunded $65.00." The system may subtract the refunded amount from the original charge to determine that the customer was not fully refunded. The system may then generate a message indicating that a full refund was not given. The system may then identify based on the NLP if the summary includes an anomalous indicator and responsive to the summary includes the anomalous indicator, identifying the anomaly associated with the event-based time-series based on the anomalous indicator. Continuing with the previous example, if the system determines the customer should have received a full refund, then the NLP's message indicates that the summary includes an anomalous indicator and may identify the refund as the anomaly.

FIG. 2B shows an illustrative diagram for generating a summary for each event in the set of events associated with the time-series data, in accordance with one or more embodiments. System 200*b* illustrates the same prompt (e.g., prompt 208) and AI model (e.g., AI model 222) as FIG. 2A. In some embodiments, however, prompt 208 may be a set of prompts where each event of the time-series corresponds to a single prompt. For instance, a first event, a second event, and a third event may each be accorded to their own individual prompt (e.g., three prompts, one for each event of the time-series). By doing so, the system may generate a set of prompts to be provided to AI model 222, where the set of prompts may be provided all at once, or individually to AI model 222.

In system 200*b*, AI model 222 may generate an individual summary (e.g., first individual summary 226, second individual summary 228, etc.) for each event in prompt 208. For example, first individual summary 226 may summarize first section 218 of prompt 208, stating, "Customer made a transaction for $75.00." Second individual summary 228 may summarize second section 220 of prompt 208, stating, "Customer disputed the transaction for $74.00 and was refunded $65.00." System 200*b* may then generate a summary (e.g., summary 224, etc.) of first individual summary 226 and second individual summary 228. Summary 224 may be generated by AI model 222, or in other embodiments, a different AI model.

In some embodiments, the system may order the set of predefined prompts based on the timestamps of each event of the set of events. The system may then provide each prompt of the ordered set of predefined prompts to AI models 222 in order to generate a set of sub-summaries. The set of sub-summaries may be generated in succession. For example, the set of predefined prompts may include a first prompt occurring at 8:00 AM and a second prompt occurring at 11:35 AM. As a result, the first prompt may first be provided to AI model 222 to generate a first sub-summary then the second prompt may be provided to AI model 222 to generate a second sub-summary. The system may then identify the anomaly associated with the event-based time-series based on the generated sub-summaries.

In another embodiment, as the system may provide the first prompt of the ordered set of predefined prompts to AI model 222, determine if there is an anomaly associated with the first prompt or the event associated with the first prompt. Responsive to not identifying an anomaly, the system may iterate through this process for each prompt of the ordered set of predefined prompts. Responsive to identifying an anomaly, the system may stop providing prompts from the ordered set of predefined prompts to AI model 222. This may save computational resources due to the system not generating a summary for each prompt of the set of predefined prompts prior to identifying the anomaly.

In an alternative embodiment, the set of predefined prompts may not be ordered prior to inputting prompts to AI model 222. Instead, a first prompt of the set of predefined prompts may be randomly selected and inputted to AI model 222 to generate a first sub-summary. The system may then determine if the first sub-summary includes an anomaly. Responsive to determining the first sub-summary does not include the first anomaly, a second prompt of the set of predefined prompts may be randomly selected and inputted to AI model 222. Responsive to determining the first sub-summary does include a first anomaly, the system may identify the anomaly based on the first sub-summary.

In other embodiments, the system may generate an aggregated summary based on aggregating each sub-summary of the set of generated sub-summaries. For example, the first sub-summary may state, "On October $7^{th}$ a transaction of $29.37 was made at a retail store," the second sub-summary may state, "On October $13^{th}$ a refund for $29.37 was made at a retail store." The aggregated summary may combine the two generated sub-summaries but add no additional information. The system may then provide the aggregated summary to the second AI model to generate an overall summary. The overall summary may add additional context describing the relationship between the first sub-summary and the second sub-summary. The additional context may include mathematical operations performed based on the numeric information provided in the sub-summaries. For example, the overall summary may state, "On October $7^{th}$ a transaction of $29.37 was made at a retail store, then six days later, the user was fully refunded the $29.37." The system may then identify the anomaly associated with the event-based time-series data based on the overall summary. Utilizing the second AI model to generate may enable the system to have access to the additional context which may allow the system to more accurately identify anomalies.

In some embodiments, the system may receive a third notification indicating a request to identify a second anomaly associated with the event-based time-series. The event-based time-series may include a first set of events corresponding to the set of events that have been stored in a database (e.g., database 112, etc.) and a second set of events that are not stored in the database. For example, the first set of events may be associated with a timeframe of Apr. 10, 2022, to Apr. 20, 2020, and may have been previously processed by the system and stored according to the schema in the database. Later, the system may receive the third notification with the second set of events which may be associated with the same event-based time-series, except from Apr. 10, 2022, to Apr. 30, 2020.

The system may then obtain from the database, using the schema, the event data of the first set of events and may then store event data for each event of the second events in database 112 according to the schema. The system may then populate, based on the schema, the set of predefined prompts using the obtained event data for each event of the first set of events and the event data for the second set of events. By doing so, the system may reduce the amount of computational resources required to identify an anomaly associated with a pre-processed time-series (e.g., where a request to identify a prior anomaly with the time-series has been submitted and processed) as the system can obtain the pre-stored/processed event data of the respective time-series from the schema, thereby forgoing the parsing, extraction, and storing steps of event data of already processed events (e.g., of the event-based time series).

In some embodiments, the first section of the first prompt of the set of predefined prompts may be populated with the event data of the first set of events and the second set of events. In other embodiments, the first section may be populated with the event data of the first set of events, and a second section of the first prompt may be populated with the event data of the second set of events. In another embodiment, the first prompt may be populated with the event data of the first set of events and a second prompt of the set of predefined prompts is populated with the event data of the second set of events. In yet another embodiment, the event data of the first set of events and the second set of events may populate the set of predefined prompts in any combination of the methods described above. One or more summaries may then be generated based on the set of predefined prompts and a second anomaly may then be identified as being associated with the event-based time-series based on the one or more summaries using any of the methods described above. The second anomaly may be the same as or different than the first anomaly. Responsive to identifying the second anomaly, the system may transmit a fourth notification comprising a second indication of the second anomaly to the user device associated with the user.

In some embodiments, the first set of events associated with the third notification may have been previously used to populate the set of predefined prompts which may have been stored in a database. In these embodiments, the populated set of predefined prompts may be retrieved from the database, and a second set of predefined prompts may be populated for the second set of events associated with the third notification. The second set of predefined prompts may be populated by any of the methods described above. A summary may then be generated by AI model 222 based on the second set of predefined prompts. In some embodiments, the system may identify the anomaly associated with the event-based time-series based on the populated set of predefined prompts and/or the second set of predefined prompts. In other embodiments the system may input the populated set of predefined prompts and the second set of predefined prompts to the second AI model and/or AI model 222 to generate an aggregated summary and/or an overall summary, as described above. The system may then identify an anomaly based on the aggregated summary and/or the overall summary. Then the system may transmit the fourth notification to the user device.

FIG. 3 shows illustrative components for a system used to identify anomalies within streamed time-series data based on retroactively captured data lineage information, in accordance with one or more embodiments. For example, FIG. 3 may show illustrative components for detecting anomalies in time-series data associated with financial account usage. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. Mobile device 322 and/or user terminal 324 may be examples of where notifications (e.g., first notification 102, second notification 118, etc.) are received from and/or transmitted to. Mobile device 322 and/or user terminal 324 may also be examples of devices that may display summaries (e.g., summary 116, summary 224, first individual summary 226, second individual summary 228, etc.) generated by AI model 222. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include database 112 and AI model 222 of FIG. 1. Cloud components 310 may access one or more databases storing the time-series data, the set of predefined prompts, and the schema.

Cloud components 310 may include model 302 (e.g., AI model 222), which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., if the time-series data comprises an anomaly, an indication of an anomaly associated with one or more events of the time-series dataset, an anomalous transaction amount etc.).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., anomalies, anomalous network operations, anomalous financial account usage, anomalous transactions, anomalous transaction amount, etc.).

In some embodiments, the model (e.g., model 302) may automatically perform actions based on outputs 306. In some embodiments, the model (e.g., model 302) may not perform any actions. The output of the model (e.g., model 302) may be used to identify an anomaly associated with the time-series data.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
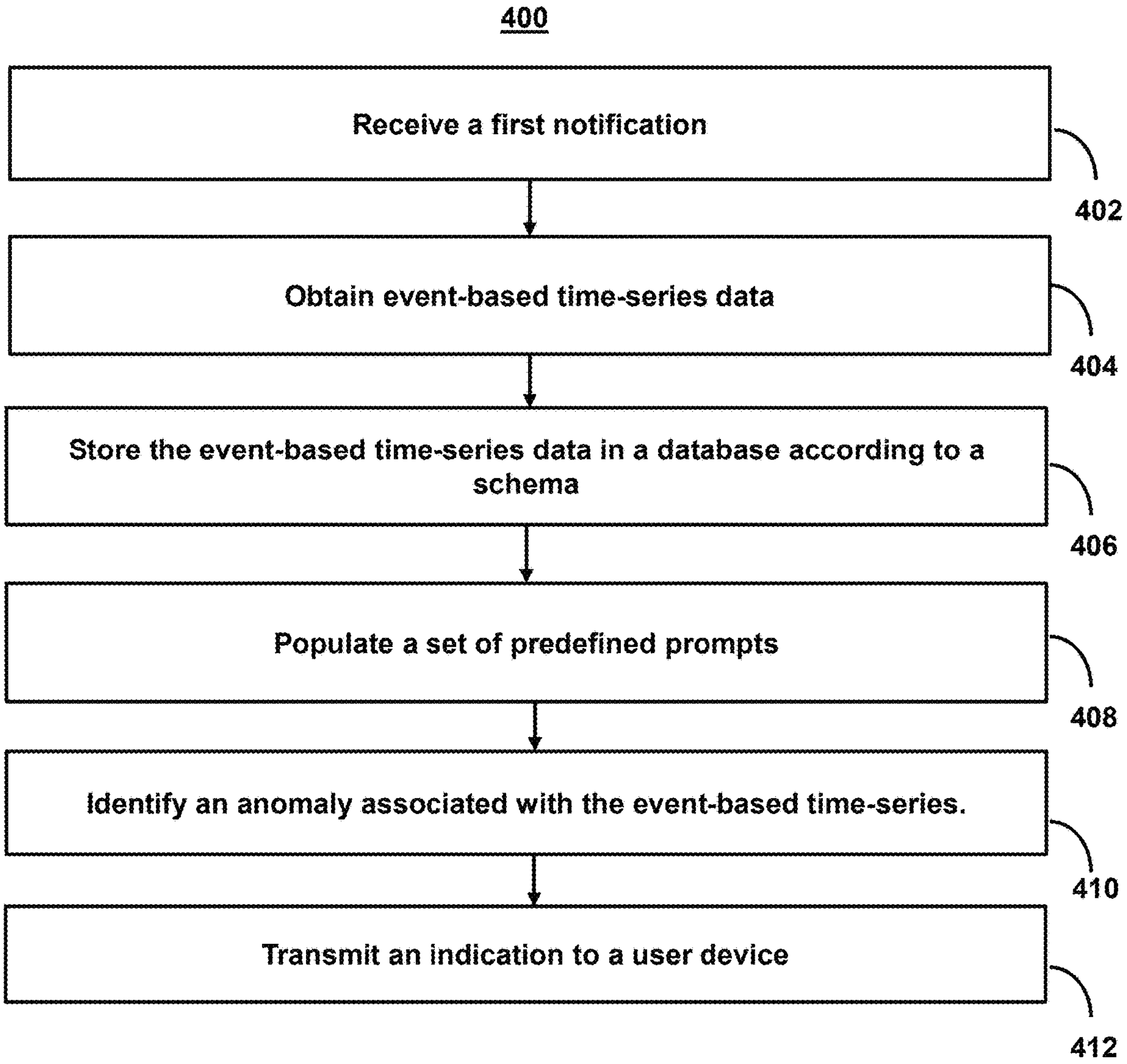
FIG. 4 shows a flowchart of the steps involved in identifying an anomaly associated with an event-based time-series, in accordance with one or more embodiments.

FIG. 4 shows a flowchart of the steps involved in identifying anomalies within streamed time-series data, in accordance with one or more embodiments. For example, the system may use process 400 (e.g., as implemented on one or more system components described above) in order to identify anomalies within streamed time-series data based on retroactively captured data lineage information.

At step 402, process 400 (e.g., using one or more components described above) may receive a first notification (e.g., first notification 102, etc.). For example, the system may receive a first notification indicating a request to identify an anomaly associated with an event-based time-series. For example, the first notification may be received from a user device (e.g., mobile device 322, user terminal 324, etc.) associated with a user and may include an account identifier associated with an account of the user. For example, the first notification may be a text indicator stating, "An error has occurred with customer number 539845," where the customer number may be an account identifier and may be associated with the event-based time-series. By doing so, the system saves on energy consumption and computational resources as compared to repeatedly checking the event-based time-series data.

At step 404, process 400 (e.g., using one or more components described above) may obtain event-based time-series data. For example, the event-based time-series data may be obtained based on the account identifier associated with the user and the event-based time-series may comprise a set of events (e.g., set of events 104, first event 202, second event 204, etc.), where each event may include event data (e.g., first event data 203, second event data 205, etc.). For example, the event data of each event may include event data in a first format and a timestamp (e.g., first timestamp 203*a*, second timestamp 205*a*, etc.) associated with the event. The system obtaining the event data responsive to receiving the notification ensures the system is looking at the most recent version of the event data and therefore may most accurately determine an anomaly.

At step 406, process 400 (e.g., using one or more components described above) may store the event-based time-series data in a database (e.g., database 112, etc.) according to a schema (e.g., schema 206, etc.). For example, the event data for each event of the set of events may be stored in the database according to the schema. The schema may define an identifier (e.g., identifier column 206*a*, etc.) indicative of a transformation applied to a first value associated with the event, the first value (e.g., first value column 206*b*, etc.) indicating a state of the event at a first time, and a second value indicating the state of the event at a second time (e.g., second value column 206*c*, etc.). Storing the event-based time-series data in the database according to the schema allows the system to (i) filter out unnecessary data that may convolute the identification of the anomaly and (ii) makes the event-data available for future use by the system. Using the schema also prevents the need for manual labeling of the event-based time-series data, as will be explained later.

In some embodiments, the event data of the set of events may be extracted from each event of the set of events in a first format. The event data of each event of the set of events may be parsed to identify the identifier (e.g., first identifier 203*f*, second identifier 205*g*, etc.), the first value, the second value, and the timestamp (e.g., first timestamp 203*a*, second timestamp 205*a*, etc.) of each event. The schema may be retrieved from a schema database (e.g., database 112, etc.) storing a set of schemas, where the schemas indicating locations of a set of tables related to identifiers indicative of transformations applied to first values associated with events, first values associated with events, second values associated with events and timestamps associated with each event. For example, the retrieved schema may indicate a location of (i) a first table that stores identifiers indicative of transformations applied to first values associated with events, (ii) a second table that stores first values associated with events, (iii) a third table that stores second values associated with events, or (iv) a fourth table associated with timestamps associated with events. The event data for each event of the set of events may be stored in the database based on the retrieved schema, where the identifiers are stored in the first table of the set of tables, the first values are stored in the second table of the set of tables, the second values are stored in the third table of the set of tables, and the timestamps are stored in the fourth table of the set of tables. By doing so, the system may organize the database according to the schema that is separated by datatypes, thereby enabling efficient retrieval of the event-data for the event-based time-series, thereby reducing the amount of computational resources required to retrieve the data.

At step 408, process 400 (e.g., using one or more components described above) may populate a set of predefined prompts (e.g., set of predefined prompts 114, etc.). For example, for each event of the set of events the identifier, the first value, and the second value may be retrieved from the database using the schema. The set of predefined prompts, which may comprise a set of sections (e.g., first section 218, second section 220, etc.) that may be populated based on the schema. Each section of the set of predefined prompts may include a set of data fields (first set of data fields 210, second set of data fields 212, etc.), where the set of data fields may correspond respectively to the identifier (e.g., the hash identifier), the first value, the second value, and a timestamp associated with a respective event of the set of events. In other embodiments, the one or more prompts of the set of predefined prompts may be predefined Large Language Model (LLM) prompts. Populating the set of predefined prompts based on the schema enables the system to efficiently obtain the data to be populated into the set of predefined prompts, while also preventing convolution of anomalous characteristics present within the event-data (e.g., by providing key information in a structured format).

In some embodiments, the set of predefined prompts may comprise a first prompt (e.g., prompt 208, etc.) retrieved from the set of predefined prompts. The system may select a first section of the first prompt, where the first section comprises a first data field corresponding to the identifier, a second data field corresponding to the first value, a third data field corresponding to the second value, and a fourth data field corresponding to a given timestamp, and where the first section of the first prompt corresponds to a first event of the set of events. For example, to provide one prompt to the AI model to identify an anomaly associated with the time-series, the system may populate a single prompt with the corresponding event data of the set of events, where each section of the prompt corresponds to a given event of the set of events. For instance, the system may transmit a request to the database to retrieve the identifier, the first value, the second value, and the timestamp associated with the first event of the set of events. For example, the system may transmit a request to obtain the hash identifier (e.g., indicating a rule set applied to an event of the set of events), the origin state of the event (e.g., original account balance), a transformed state of the event (e.g., the updated account balance), and the timestamp at which the event (e.g., transaction) occurred. The system may receive the identifier, the first value, the second value, and the timestamp associated with the first event of the set of events from the database. The system may populate the first section of the first prompt by populating the first data field with the identifier associated with the first event of the set of events (e.g., first identifier 203*f*, etc.), the second data field with the first value associated with the first event of the set of events (e.g., first original account balance 203*c*, etc.), the third data field with the second value associated with the first event of the set of events (e.g., first new account balance 203*d*, etc.), and the fourth data field with the timestamp associated with the first event of the set of events (e.g., first timestamp 203*a*, etc.). By doing so, the system may populate the predefined prompt in a structured manner that filters out unnecessary event-data that may convolute or otherwise hide anomalous characteristics, thereby enabling the system to (i) reduce the amount of computer processing and memory resources needed to identify an anomaly and (ii) improve anomaly identification.

In some embodiments, the system may populate a set of predefined prompts where each prompt of the set of predefined prompts correspond to a given event of the set of events of the event-based time-series. For example, the system may retrieve a first prompt from the set of predefined prompts. The first prompt may correspond to a first event of the set of events and may comprise a first section which may comprise a first data field corresponding to the identifier, a second data field corresponding to the first value, a third data field corresponding to the second value, and a fourth data field corresponding to a given timestamp. The system may transmit a request to the database to retrieve the identifier, the first value, the second value, and the timestamp associated with the first event of the set of events. In response to the request, the system may receive the identifier, the first value, the second value, and the timestamp associated with the first event of the set of events from the database. The first section of the first prompt may be populated by populating the first data field with the identifier associated with the first event of the set of events, the second data field with the first value associated with the first event of the set of events, the third data field with the second value associated with the first event of the set of events, and the fourth data field with the timestamp associated with the first event of the set of events. By doing so, the system may populate separate prompts for each event of the event-based time-series, thereby providing an organized data structure to the AI model to decrease collisions between anomalous characteristics present in the event-based time-series.

In some embodiments, the system may populate the set of predefined prompts with a rule set associated with a given event of the set of events of the event-based time-series. For example, to provide further contextual information associated with the states of the events at points in time (e.g., data lineage), the system may additionally include the rule sets (e.g., as described above) into the prompts. For instance, as described above, the rule sets may indicate a set of operations performed in association with the event, such as operations performed on the first value (e.g., the original state, the original balance, etc.) of the event to obtain the second value (e.g., the transformed state, the updated balance, etc.) associated with the event. By including such information in the prompts as opposed to simply the identifier, the system may further reduce the amount of computational resources expended on identifying which operations were applied to the event data (e.g., by performing a database lookup using the identifier), but rather may have a richer source of data (e.g., the rule set itself) to identify one or more anomalies.

As such, the system may transmit a request to retrieve the identifier, the first value, the second value, and the timestamp associated with a first event of the set of events. For example, the system may receive the identifier, the first value, the second value, and the timestamp associated with the first event of the set of events from the database in response to transmitting the request. The system may select a first prompt from the set of predefined prompts for the first event of the set of events-based of the identifier associated with the first event. For example, each prompt of the set of predefined prompts may be associated with identifiers corresponding to a respective rule set, with the rule set prepopulated into the prompt. As an example, the system may select the first prompt (e.g., from the set of predefined prompts) by querying a database (e.g., database 112) storing the set of predefined prompts with the identifier for the first event. The system may retrieve the first prompt for the first event (e.g., based on the identifier for the first event) that includes the rule set associated with the identifier. The system may then select a first section of the first prompt. The first section of the first prompt may include a first data field corresponding to the identifier, a second data field corresponding to the first value, a third data field corresponding to the second value, a fourth data field corresponding to a given timestamp, and a fifth data field corresponding to a rule set associated with the identifier. For example, the fifth data field may be prepopulated with the rule set itself that is associated with the identifier to provide additional contextual information to the prompt/AI model. The first section of the first prompt may be populated by populating the first data field with the identifier associated with the first event of the set of events, the second data field with the first value associated with the first event of the set of events, the third data field with the second value associated with the first event of the set of events, and the fourth data field with the timestamp associated with the first event of the set of events. By doing so, the system may determine whether an anomaly has occurred within the event-based time-series based on the rule set and the transformed state of the data—thereby reducing the amount of computational resources expended querying a database for the rule set itself.

At step 410, process 400 (e.g., using one or more components described above) may identify an anomaly associated with the event-based time-series. For example, the system may identify the anomaly associated with the event-based time-series based on a summary (e.g., summary 116, summary 224, etc.) generated by an artificial intelligence model. For instance, the system may provide the set of predefined prompts to the artificial intelligence model trained to generate summaries of events using information included in predefined prompts. By doing so, the system may accurately identify one or more anomalies associated with a time-series using domain-specific, filtered, event information.

In some embodiments, the system may generate a set of sub-summaries based on an ordered set of predefined prompts. For example, in response to populating the set of predefined prompts, the system may order the set of predefined prompts based on the timestamps of each event of the set of events. For instance, the system may order the predefined prompts according to the timestamps associated with each prompt (e.g., oldest to newest, newest to oldest, etc.). The system may provide the set of ordered predefined prompts to the artificial intelligence model in succession to generate a set of sub-summaries (e.g., first individual summary 226, second individual summary 228, etc.), such that the artificial intelligence model generates a sub-summary of each ordered predefined prompt in succession and may identify the anomaly associated with the event-based time-series based on the generated sub-summaries. For instance, to reduce the amount of computational resources involved with processing the entire set of predefined prompts at once, the system may provide the set of ordered predefined prompts one by one. By doing so, the system may generate a sub-summary (e.g., a summary) for each event as the corresponding prompt is provided to the AI model, and may identify whether an anomaly exists based on the summary. That is, by successively inputting each predefined prompt of the ordered set of predefined prompts to the artificial intelligence model, the system may identify an anomaly early on during AI model processing of the prompts, thereby saving computational resources that would otherwise be expended by processing the entire set of predefined prompts at once.

In some embodiments, the anomaly associated with the event-based time-series may be identified by generating an aggregated summary based on aggregating each sub-summary of the set of generated sub-summaries. For example, the system may combine each sub-summary to generate an aggregated summary. The aggregated summary may be provided to a second artificial intelligence model to generate the summary and the anomaly associated with the event-based time-series may be identified based on the summary. For example, the system may provide each sub-summary to a second artificial intelligence model (e.g., an NLP model, AI model 222, or other artificial intelligence model) to identify the anomaly associated with the event-based summary.

In some embodiments, prior to providing a second ordered predefined prompt of the set of predefined prompts to the artificial intelligence model, the system may determine whether a first sub-summary generated by the artificial intelligence model based on a first ordered predefined prompt includes a first anomaly. For example, with respect to the above, when the ordered set of predefined prompts are provided to the artificial intelligence model (e.g., AI model 222) in succession, the system may determine whether a first sub-summary includes an identified anomaly associated with the event-based time series. In response to determining that the first sub-summary comprises the first anomaly, the system may identify the anomaly associated with the event-based time-series may be identified based on the first anomaly associated with the first ordered prompt. By doing so, the system may conserve computational resources by forgoing additional processing of the ordered set of prompts. When the first sub-summary does not comprise the first anomaly, the system may continue providing the set of ordered predefined prompts in succession to the artificial intelligence model. For example, the system may provide a second ordered predefined prompt to the artificial intelligence model to determine whether a second sub-summary generated by the artificial intelligence model comprises a second anomaly. In response to the system determining that the second sub-summary comprises the second anomaly, the system may identify the anomaly associated with the event-based time-series based on the second anomaly. For example, the system may use the identified second anomaly as the anomaly associated with the event-based time-series.

In some embodiments, the anomaly associated with the event-based time-series may be identified by proving the summary to a second-artificial intelligence model trained to identify anomalous events associated with event-based time-series. For example, the system may provide the summary to a second-artificial intelligence model trained on labeled training data comprising (i) summaries and (ii) identified anomalies to generate a prediction as to whether a summary includes an anomaly associated with a time-series dataset. Upon providing the summary to the second-artificial intelligence model, the system may receive an indication as to whether the summary includes an anomaly or not. In other embodiments, the system may receive the identified anomaly (e.g., as opposed to an indication as to whether an anomaly exists or not). For example, the system may receive the identified anomaly, such as "account balance discrepancy of $10" (e.g., based on summary 224).

In some embodiments, the anomaly associated with the event-based time-series may be identified by performing natural language processing (NLP) on the summary generated by the artificial intelligence model (e.g., AI model 222). For example, the system may identify, based on the NLP, whether the summary comprises an anomalous indicator. For instance, where the summary is "The customer was originally charged $75.00 for a transaction, the customer disputed the transaction and was then refunded $65.00," the NLP may identify that a $10 account balance discrepancy (e.g., the anomalous indicator) exists within the summary. In response to the summary comprising the anomalous indicator, the system may identify the anomaly associated with the event-based time-series based on the anomalous indicator. For example, the system may use the anomalous indicator as the identified anomaly. By doing so, the system may verify whether an anomaly exists within the time-series dataset.

In some embodiments, the identified anomaly associated with the event-based time-series may be the summary generated by the artificial intelligence model. For example, as the artificial intelligence model (AI model 222) may be trained to identify anomalous behavior of time-series datasets, the AI model may be predisposed to extracting anomalies present within a time-series dataset. As such, the summary generated by the artificial intelligence model may constitute the anomaly itself, thereby enabling the system to conserve computational resources associated with additional processing of the generated summary to identify an anomaly.

At step 412, process 400 (e.g., using one or more components described above) may transmit an indication to the user device. For example, the system may generate a second notification (e.g., second notification 118, etc.) comprising an indication of the identified anomaly, and may transmit the second notification to the user device. Providing the second notification to the user device enables the system to quickly notify a user of the anomaly, so that the anomaly may be quickly rectified.

In some embodiments, a third notification indicating a request to identify a second anomaly associated with the event-based time-series may be received. The event-based time-series may include a first set of events corresponding to the set of events that have been stored in the database and a second set of events that are not stored in the database. The event data for each event of the first set of events may then be obtained from the database using the schema and the event data for each event of the second set of events may be stored in the database according to the schema. The set of predefined prompts may then be populated based on the schema, using the obtained event data for each event of the first set of events and the event data for each event of the second set of events. The second anomaly associated with the event-based time-series may be identified based on a second summary generated by the artificial intelligence model, by providing the set of predefined prompts to the artificial intelligence model and a fourth notification including a second indication of the identified second anomaly may be transmitted to the user device associated with the user. Enabling the system to determine that part of the event-based time-series may have been previously stored in the database saves computational resources by enabling the system to utilize previously stored event data.

In other embodiments, the event-based time-series associated with the third notification may include a first set of events corresponding to a populated set of predefined prompts in the database and a second set of events that do not correspond to the populated set of predefined prompts in the prompt database. Each event in the second set of events may include event data. The populated set of predefined prompts associated with the first set of events may then be retrieved from the prompt database. Then, a second set of predefined prompts may be populated, using the schema and the second set of predefined prompts and the event data for each event of the second set of events. The system may then identify the second anomaly associated with the event-based time-series based on a second summary generated by the artificial intelligence model by providing the retrieved populated set of predefined prompts associated with the first set of events and the sec set of predefined prompts to the artificial intelligence model. A fourth notification including a second indication of the identified second anomaly may be transmitted to the user device associated with the user. Enabling the system to determine part of the event-based time-series has previously been used to populate a set of predefined prompts enables the system to save on computational resources by avoiding unnecessarily repopulating previously populated set of predefined prompts.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for identifying anomalies within streamed time-series data based on retroactively captured data lineage information.

2. The method of the preceding embodiment, further comprising: receiving a first notification indicating a request to identify an anomaly associated with an event-based time-series; obtaining the event-based time-series, based on an account identifier associated with a user, wherein the event-based time-series comprises a set of events, wherein each event comprises event data; storing the event data for each event of the set of events in a database according to a schema defining (i) an identifier indicative of a transformation applied to a first value associated with the event, (ii) the first value indicating a state of the event at a first time, and (iii) a second value indicating the state of the event at a second time; populating, based on the schema, a set of predefined prompts that each comprise a set of sections, each section comprising a set of data fields, wherein the set of data fields correspond respectively to (i) the identifier, (ii) the first value, (iii) the second value, and (iv) a timestamp associated with a respective event of the set of events; identifying the anomaly associated with the event-based time-series based on a summary generated by an artificial intelligence model, by providing the set of predefined prompts to the artificial intelligence model, wherein the artificial intelligence model is trained to generate summaries of events using information included in predefined prompts; and transmitting a second notification comprising an indication of the identified anomaly to a user device associated with the user.

3. The method of any one of the preceding embodiments, wherein populating the set of predefined prompts further comprises: retrieving a first prompt from the set of predefined prompts; selecting a first section of the first prompt, wherein the first section comprises a first data field corresponding to the identifier, a second data field corresponding to the first value, a third data field corresponding to the second value, and a fourth data field corresponding to a given timestamp, and wherein the first section of the first prompt corresponds to a first event of the set of events; transmitting a request to the database to retrieve (i) the identifier, (ii) the first value, (iii) the second value, and (iv) the timestamp associated with the first event of the set of events; receiving, from the database, (i) the identifier, (ii) the first value, (iii) the second value, and (iv) the timestamp associated with the first event of the set of events; and populating first section of the first prompt by populating: the first data field with the identifier associated with the first event of the set of events; the second data field with the first value associated with the first event of the set of events; the third data field with the second value associated with the first event of the set of events; and the fourth data field with the timestamp associated with the first event of the set of events.

4. The method of any one of the preceding embodiments, wherein populating the set of predefined prompts further comprises: retrieving a first prompt from the set of predefined prompts, wherein the first prompt corresponds to a first event of the set of events, and wherein the first prompt comprises a first section of the first prompt, the first section comprising a first data field corresponding to the identifier, a second data field corresponding to the first value, a third data field corresponding to the second value, and a fourth data field corresponding to a given timestamp; transmitting a request to the database to retrieve (i) the identifier, (ii) the first value, (iii) the second value, and (iv) the timestamp associated with the first event of the set of events; receiving, from the database, (i) the identifier, (ii) the first value, (iii) the second value, and (iv) the timestamp associated with the first event of the set of events; and populating first section of the first prompt by populating: the first data field with the identifier associated with the first event of the set of events; the second data field with the first value associated with the first event of the set of events; the third data field with the second value associated with the first event of the set of events; and the fourth data field with the timestamp associated with the first event of the set of events.

5. The method of any one of the preceding embodiments, wherein populating the set of predefined prompts further comprises: transmitting a request to the database to retrieve (i) the identifier, (ii) the first value, (iii) the second value, and (iv) the timestamp associated with a first event of the set of events; receiving, from the database, (i) the identifier, (ii) the first value, (iii) the second value, and (iv) the timestamp associated with the first event of the set of events; selecting, for the first event of the set of events, a first prompt from the set of predefined prompts based on the identifier associated with the first event; selecting a first section of the first prompt, wherein the first section comprises a first data field corresponding to the identifier, a second data field corresponding to the first value, a third data field corresponding to the second value, a fourth data field corresponding to a given timestamp, and a fifth data field corresponding to a rule set associated with the identifier; and populating the first section of the first prompt by populating: the first data field with the identifier associated with the first event of the set of events; the second data field with the first value associated with the first event of the set of events; the third data field with the second value associated with the first event of the set of events; and the fourth data field with the timestamp associated with the first event of the set of events.

6. The method of any one of the preceding embodiments, wherein identifying the anomaly associated with the event-based time-series further comprises: in response to populating the set of predefined prompts, ordering the set of predefined prompts, based on the timestamps of each event of the set of events, wherein each ordered predefined prompt of the set of ordered predefined prompts corresponds to a respective event of the set of events; providing each ordered predefined prompt of the set of predefined prompts to the artificial intelligence model in succession to generate a set of sub-summaries, such that the artificial intelligence model generates a sub-summary of each ordered predefined prompt in succession; and identifying the anomaly associated with the event-based time-series based on the generated sub-summaries.

7. The method of any one of the preceding embodiments wherein identifying the anomaly associated with the event-based time-series further comprises generating an aggregated summary based on aggregating each sub-summary of the set of generated sub-summaries; providing the aggregated summary to a second artificial intelligence model to generate the summary; and identifying the anomaly associated with the event-based time-series based on the summary.

8. The method of any one of the preceding embodiments, wherein identifying the anomaly associated with the event-based time-series further comprises: prior to providing a second ordered predefined prompt of the set of predefined prompt to the artificial intelligence model, determining whether a first sub-summary generated by the artificial intelligence model based on a first ordered predefined prompt comprises a first anomaly; and in response to determining that the first sub-summary comprises the first anomaly, identifying the anomaly associated with the event-based time-series based on the first anomaly.

9. The method of any one of the preceding embodiments, wherein identifying the anomaly associated with the event-based time-series further comprises: prior to providing a second ordered predefined prompt of the set of predefined prompts to the artificial intelligence model, determining whether a first sub-summary generated by the artificial intelligence model based on a first ordered predefined prompt comprises a first anomaly; in response to determining that the first sub-summary does not comprise the first anomaly, providing the second ordered predefined prompt of the set of predefined prompts to the artificial intelligence model; determining whether a second sub-summary generated by the artificial intelligence model based on the second ordered predefined prompt of the set of predefined prompts comprises a second anomaly; and in response to determining that the second sub-summary comprises the second anomaly, identifying the anomaly associated with the event-based time-series based on the second anomaly.

10. The method of any one of the preceding embodiments, wherein identifying the anomaly associated with the event-based time-series further comprises: providing the summary to a second artificial intelligence model trained to identify anomalous events associated with the event-based time-series; and receiving, from the second artificial intelligence model, the identified anomaly associated with the event-based time-series.

11. The method of any one of the preceding embodiments, wherein identifying the anomaly associated with the event-based time-series further comprises: performing natural language processing (NLP) on the summary generated by the artificial intelligence model; identifying, based on the NLP, whether the summary comprises an anomalous indicator; and in response to the summary comprising the anomalous indicator, identifying the anomaly associated with the event-based time-series based on the anomalous indicator.

12. The method of any one of the preceding embodiments, wherein the identified anomaly associated with the event-based time-series is the summary generated by the artificial intelligence model.

13. The method of any one of the preceding embodiments, wherein storing the event data for each event of the set of events in a database according to a schema further comprises: extracting, from each event of the set of events, the event data of the set of events in a first format; parsing the event data of each event of the set of events to identify (i) the identifier, (ii) the first value, (iii) the second value, and (iv) the timestamp of each event; retrieving the schema from a schema database storing a set of schemas, the schema indicating locations of a set of tables related to (i) identifiers indicative of transformations applied to first values associated with events, (ii) first values associated with events, (iii) second values associated with events, and (iv) timestamps associated with each event; and storing, based on the retrieved schema, the event data for each event of the set of events in the database wherein: (i) the identifiers are stored in a first table of the set of tables; (ii) the first values are stored in a second table of the set of tables; (iii) the second values are stored in a third table of the set of tables; and (iv) the timestamps are stored in a fourth table of the set of tables.

14. The method of any one of the preceding embodiments, the method further comprising: receiving a third notification indicating a request to identify a second anomaly associated with the event-based time-series, wherein the event-based time-series comprises (i) a first set of events corresponding to the set of events that have been stored in the database and (ii) a second set of events that are not stored in the database; obtaining from the database using the schema, the event data for each event of the first set of events; storing event data for each event of the second set of events in the database according to the schema; populating, based on the schema, the set of predefined prompts using (i) the obtained event data for each event of the first set of events and (ii) the event data for each event of the second set of events; identifying the second anomaly associated with the event-based time-series based on a second summary generated by the artificial intelligence model, by providing the set of predefined prompts to the artificial intelligence model; and transmitting a fourth notification comprising a second indication of the identified second anomaly to the user device associated with the user.

15. The method of any one of the preceding embodiments, wherein the set of predefined prompts are stored in a prompt database subsequent to the set of predefined prompts being populated, the method further comprising: receiving a third notification indicating a request to identify a second anomaly associated with the event-based time-series, wherein the event-based time-series comprises (i) a first set of events corresponding to the populated set of predefined prompts in the prompt database and (ii) a second set of events that do not correspond to the populated set of predefined prompts in the prompt database, wherein each event in the second set of events comprises second event data; retrieving the populated set of predefined prompts associated with the first set of events from the prompt database; populating, using the schema, a second set of predefined prompts using (i) the second set of predefined prompts and (ii) the second event data for each event of the second set of events; identifying the second anomaly associated with the event-based time-series based on a second summary generated by the artificial intelligence model, by providing (i) the retrieved populated set of predefined prompts associated with the first set of events and (ii) the second set of predefined prompts to the artificial intelligence model; and transmitting a fourth notification comprising a second indication of the identified second anomaly to the user device associated with the user.

17. The method of any one of the preceding embodiments, wherein the event-based time-series is a security-event-based time-series.

18. The method of any one of the preceding embodiments, wherein the event data is security-alert data.

19. The method of any one of the preceding embodiments, and wherein the event-based time-series comprises a set of security-alerts.

20. The method of any one of the preceding embodiments, wherein identifying anomalies within the streamed time-series data based on retroactively captured data lineage information is identifying anomalies within streamed security-alert data based on retroactively obtained data-transformation information.

21. One or more non-transitory, computer-readable mediums storing instructions that, when executed by a data processing apparatus, cause the data processing apparatus to perform operations comprising those of any of embodiments 1-20.

22. A system comprising one or more processors; and memory storing instructions that, when executed by the processors, cause the processors to effectuate operations comprising those of any of embodiments 1-20.

23. A system comprising means for performing any of embodiments 1-20.

What is claimed is:

1. A system for identifying anomalies within streamed security-alert data based on retroactively obtained data-transformation information, the system comprising:

one or more processors; and a non-transitory, computer-readable medium comprising instructions recorded thereon that, when executed by the one or more processors, cause operations comprising:

receive a first notification from a user device associated with a user indicating a request to identify an anomaly associated with a security-event-based time-series, wherein the notification comprises an account identifier associated with an account of the user;

obtain, based on the account identifier associated with the account of the user, the security-event-based time-series at a first time, wherein the security-event-based time-series comprises a set of security-alerts, wherein each security-alert comprises (i) security-alert data in a first format and (ii) a timestamp associated with the security-alert;

extract, from each security-alert of the set of security-alerts, the security-alert data and the timestamp associated with the security-alert;

parse the security-alert data for each security-alert of the set of security-alerts to identify (i) a hash identifier indicative of a transformation applied to a first value associated with the security-alert, (ii) the first value associated with the security-alert, wherein the first value indicates a state of the security-alert at a second time, and (iii) a second value associated with the security-alert, wherein the second value indicates the state of the security-alert at a third time;

store, for each security-alert of the set of security-alerts, (i) the hash identifier, (ii) the first value, and (iii) the second value, and (iv) the timestamp associated with the respective security-alert, in database according to a schema that is in a second format different from the first format;

retrieve, for each security-alert of the set of security-alerts, from the database using the schema, (i) the hash identifier, (ii) the first value, (iii) the second value, and (iv) the timestamp associated with the respective security-alert to populate a predefined LLM prompt;

populate a predefined Large Language Model (LLM) prompt based on the schema, the predefined LLM prompt comprising a set of sections, wherein each section corresponds to first security-alert of the set of security-alerts, each section comprising a set of data fields, wherein the set of data fields correspond respectively to (i) the hash identifier, (ii) the first value, (iii) the second value, and (iv) the timestamp associated with the first security-alert;

identify the anomaly associated with the security-event-based time-series based on a summary generated by an LLM, by providing the predefined LLM prompt to the LLM, wherein the LLM is configured to generate summaries of security-alerts using information included in predefined LLM prompts; and transmit a second notification comprising the identified anomaly to the user device associated with the user.

2. A method for identifying anomalies within streamed security-alert data based on retroactively obtained data-transformation information, the method comprising:

receiving a first notification indicating a request to identify an anomaly associated with a security-event-based time-series;

obtaining the security-event-based time-series, based on an account identifier associated with a user, wherein the security-event-based time-series comprises a set of security-alerts, wherein each security-alert comprises security-alert data;

storing the security-alert data for each security-alert of the set of security-alerts in a database according to a schema defining (i) an identifier indicative of a transformation applied to a first value associated with the security-alert, (ii) the first value indicating a state of the security-alert at a first time, and (iii) a second value indicating the state of the security-alert at a second time;

populating, based on the schema, a set of predefined prompts that each comprise a set of sections, each section comprising a set of data fields, wherein the set of data fields correspond respectively to (i) the identifier, (ii) the first value, (iii) the second value, and (iv) a timestamp associated with a respective security-alert of the set of security-alerts;

identifying the anomaly associated with the security-event-based time-series based on a summary generated by an artificial intelligence model, by providing the set of predefined prompts to the artificial intelligence model, wherein the artificial intelligence model is trained to generate summaries of security-alerts using information included in predefined prompts; and transmitting a second notification comprising an indication of the identified anomaly to a user device associated with the user.

3. The method of claim 2, wherein populating the set of predefined prompts further comprises:

retrieving a first prompt from the set of predefined prompts;

selecting a first section of the first prompt, wherein the first section comprises a first data field corresponding to the identifier, a second data field corresponding to the first value, a third data field corresponding to the second value, and a fourth data field corresponding to a given timestamp, and wherein the first section of the first prompt corresponds to a first security-alert of the set of security-alerts;

transmitting a request to the database to retrieve (i) the identifier, (ii) the first value, (iii) the second value, and (iv) the timestamp associated with the first security-alert of the set of security-alerts;

receiving, from the database, (i) the identifier, (ii) the first value, (iii) the second value, and (iv) the timestamp associated with the first security-alert of the set of security-alerts; and populating the first section of the first prompt by populating:

the first data field with the identifier associated with the first security-alert of the set of security-alerts;

the second data field with the first value associated with the first security-alert of the set of security-alerts;

the third data field with the second value associated with the first security-alert of the set of security-alerts; and the fourth data field with the timestamp associated with the first security-alert of the set of security-alerts.

4. The method of claim 2, wherein populating the set of predefined prompts further comprises:

retrieving a first prompt from the set of predefined prompts, wherein the first prompt corresponds to a first security-alert of the set of security-alerts, and wherein the first prompt comprises a first section of the first prompt, the first section comprising a first data field corresponding to the identifier, a second data field corresponding to the first value, a third data field corresponding to the second value, and a fourth data field corresponding to a given timestamp;

transmitting a request to the database to retrieve (i) the identifier, (ii) the first value, (iii) the second value, and (iv) the timestamp associated with the first security-alert of the set of security-alerts;

receiving, from the database, (i) the identifier, (ii) the first value, (iii) the second value, and (iv) the timestamp associated with the first security-alert of the set of security-alerts; and populating the first section of the first prompt by populating:

the first data field with the identifier associated with the first security-alert of the set of security-alerts;

the second data field with the first value associated with the first security-alert of the set of security-alerts;

the third data field with the second value associated with the first security-alert of the set of security-alerts; and the fourth data field with the timestamp associated with the first security-alert of the set of security-alerts.

5. The method of claim 2, wherein populating the set of predefined prompts further comprises:

transmitting a request to the database to retrieve (i) the identifier, (ii) the first value, (iii) the second value, and (iv) the timestamp associated with a first security-alert of the set of security-alerts;

receiving, from the database, (i) the identifier, (ii) the first value, (iii) the second value, and (iv) the timestamp associated with the first security-alert of the set of security-alerts;

selecting, for the first security-alert of the set of security-alerts, a first prompt from the set of predefined prompts based on the identifier associated with the first security-alert;

selecting a first section of the first prompt, wherein the first section comprises a first data field corresponding to the identifier, a second data field corresponding to the first value, a third data field corresponding to the second value, a fourth data field corresponding to a given timestamp, and a fifth data field corresponding to a rule set associated with the identifier; and populating the first section of the first prompt by populating:

the first data field with the identifier associated with the first security-alert of the set of security-alerts;

the second data field with the first value associated with the first security-alert of the set of security-alerts;

the third data field with the second value associated with the first security-alert of the set of security-alerts; and the fourth data field with the timestamp associated with the first security-alert of the set of security-alerts.

6. The method of claim 2, wherein identifying the anomaly associated with the security-event-based time-series further comprises:

in response to populating the set of predefined prompts, ordering the set of predefined prompts, based on the timestamps of each security-alert of the set of security-alerts, wherein each ordered predefined prompt of the set of ordered predefined prompts corresponds to a respective security-alert of the set of security-alerts;

providing each ordered predefined prompt of the set of predefined prompts to the artificial intelligence model in succession to generate a set of sub-summaries, such that the artificial intelligence model generates a sub-summary of each ordered predefined prompt in succession; and identifying the anomaly associated with the security-event-based time-series based on the generated sub-summaries.

7. The method of claim 6, wherein identifying the anomaly associated with the security-event-based time-series further comprises:

generating an aggregated summary based on aggregating each sub-summary of the set of generated sub-summaries;

providing the aggregated summary to a second artificial intelligence model to generate the summary; and identifying the anomaly associated with the security-event-based time-series based on the summary.

8. The method of claim 6, wherein identifying the anomaly associated with the security-event-based time-series further comprises:

prior to providing a second ordered predefined prompt of the set of predefined prompts to the artificial intelligence model, determining whether a first sub-summary generated by the artificial intelligence model based on a first ordered predefined prompt comprises a first anomaly; and in response to determining that the first sub-summary comprises the first anomaly, identifying the anomaly associated with the security-event-based time-series based on the first anomaly.

9. The method of claim 6, wherein identifying the anomaly associated with the security-event-based time-series further comprises:

prior to providing a second ordered predefined prompt of the set of predefined prompts to the artificial intelligence model, determining whether a first sub-summary generated by the artificial intelligence model based on a first ordered predefined prompt comprises a first anomaly;

in response to determining that the first sub-summary does not comprise the first anomaly, providing the second ordered predefined prompt of the set of predefined prompts to the artificial intelligence model;

determining whether a second sub-summary generated by the artificial intelligence model based on the second ordered predefined prompt of the set of predefined prompts comprises a second anomaly; and in response to determining that the second sub-summary comprises the second anomaly, identifying the anomaly associated with the security-event-based time-series based on the second anomaly.

10. The method of claim 2, wherein identifying the anomaly associated with the security-event-based time-series further comprises:

providing the summary to a second artificial intelligence model trained to identify anomalous security-alerts associated with the security-event-based time-series; and receiving, from the second artificial intelligence model, the identified anomaly associated with the security-event-based time-series.

11. The method of claim 2, wherein identifying the anomaly associated with the security-event-based time-series further comprises:

performing natural language processing (NLP) on the summary generated by the artificial intelligence model;

identifying, based on the NLP, whether the summary comprises an anomalous indicator; and in response to the summary comprising the anomalous indicator, identifying the anomaly associated with the security-event-based time-series based on the anomalous indicator, wherein the summary comprises the anomalous indicator.

12. The method of claim 2, wherein the identified anomaly associated with the security-event-based time-series is the summary generated by the artificial intelligence model.

13. The method of claim 2, wherein storing the security-alert data for each security-alert of the set of security-alerts in the database according to the schema further comprises:

extracting, from each security-alert of the set of security-alerts, the security-alert data of the set of security-alerts in a first format;

parsing the security-alert data of each security-alert of the set of security-alerts to identify (i) the identifier, (ii) the first value, (iii) the second value, and (iv) the timestamp of each security-alert;

retrieving the schema from a schema database storing a set of schemas, the schema indicating locations of a set of tables related to (i) identifiers indicative of transformations applied to first values associated with security-alerts, (ii) first values associated with security-alerts, (iii) second values associated with security-alerts, and (iv) timestamps associated with each security-alert; and storing, based on the retrieved schema, the security-alert data for each security-alert of the set of security-alerts in the database wherein:

(i) the identifiers are stored in a first table of the set of tables;

(ii) the first values are stored in a second table of the set of tables;

(iii) the second values are stored in a third table of the set of tables; and (iv) the timestamps are stored in a fourth table of the set of tables.

14. The method of claim 2, wherein the method further comprising:

receiving a third notification indicating a request to identify a second anomaly associated with the security-event-based time-series, wherein the security-event-based time-series comprises (i) a first set of security-alerts corresponding to the set of security-alerts that have been stored in the database and (ii) a second set of security-alerts that are not stored in the database;

obtaining from the database using the schema, the security-alert data for each security-alert of the first set of security-alerts;

storing security-alert data for each security-alert of the second set of security-alerts in the database according to the schema;

populating, based on the schema, the set of predefined prompts using (i) the obtained security-alert data for each security-alert of the first set of security-alerts and (ii) the security-alert data for each security-alert of the second set of security-alerts;

identifying the second anomaly associated with the security-event-based time-series based on a second summary generated by the artificial intelligence model, by providing the set of predefined prompts to the artificial intelligence model; and transmitting a fourth notification comprising a second indication of the identified second anomaly to the user device associated with the user.

15. The method of claim 2, wherein the set of predefined prompts are stored in a prompt database subsequent to the set of predefined prompts being populated, the method further comprising:

receiving a third notification indicating a request to identify a second anomaly associated with the security-event-based time-series, wherein the security-event-based time-series comprises (i) a first set of security-alerts corresponding to the populated set of predefined prompts in the prompt database and (ii) a second set of security-alerts that do not correspond to the populated set of predefined prompts in the prompt database, wherein each security-alert in the second set of security-alerts comprises second security-alert data;

retrieving the populated set of predefined prompts associated with the first set of security-alerts from the prompt database;

populating, using the schema, a second set of predefined prompts using (i) the second set of predefined prompts and (ii) the second security-alert data for each security-alert of the second set of security-alerts;

identifying the second anomaly associated with the security-event-based time-series based on a second summary generated by the artificial intelligence model, by providing (i) the retrieved populated set of predefined prompts associated with the first set of security-alerts and (ii) the second set of predefined prompts to the artificial intelligence model; and transmitting a fourth notification comprising a second indication of the identified second anomaly to the user device associated with the user.

16. One or more non-transitory computer-readable media comprising instructions that, when executed by one or more processors, cause operations comprising:

obtaining an security-event-based time-series associated with an anomaly, wherein each security-alert of the security-event-based time-series comprises a set of security-alerts and each security-alert comprises security-alert data;

storing the security-alert for each security-alert of the set of security-alerts in a database according to a schema defining (i) a first value indicating a state of the security-alert at a first time and (ii) a second value indicating the state of the security-alert at a second time;

populating, based on the schema, a set of predefined prompts that each comprise a set of data fields, wherein the set of data fields correspond respectively to (i) the first value, (ii) the second value, and (iii) a timestamp associated with a respective security-alert of the set of security-alerts;

identifying the anomaly associated with the security-event-based time-series based on a summary generated by an artificial intelligence model, by providing the set of predefined prompts to the artificial intelligence model, wherein the artificial intelligence model is trained to generate summaries of security-alerts using information included in predefined prompts; and transmitting a second notification comprising an indication of the identified anomaly to a user device associated with a user.

17. The media of claim 16, wherein populating the set of predefined prompts further comprises:

retrieving a first prompt from the set of predefined prompts, wherein the first prompt comprises a first data field corresponding to the first value, a second data field correspond to the second value, and a third data field corresponding to a given timestamp, and wherein the first prompt corresponds to a first security-alert of the set of security-alerts;

transmitting a request to the database to retrieve (i) the first value, (ii) the second value, and (iii) the timestamp associated with the first security-alert of the set of security-alerts;

receiving, from the database, (i) the first value, (ii) the second value, and (iii) the timestamp associated with the first security-alert of the set of security-alerts; and populating the first prompt by populating:

the first data field with the first value associated with the first security-alert of the set of security-alerts;

the second data field with the second value associated with the first security-alert of the set of security-alerts; and the third data field with the timestamp associated with the first security-alert of the set of security-alerts.

18. The media of claim 16, wherein identifying the anomaly associated with the security-event-based time-series further comprises:

in response to populating the set of predefined prompts, ordering the set of predefined prompts, based on the timestamps of each security-alert of the set of security-alerts, wherein each ordered predefined prompt of the set of ordered predefined prompts corresponds to a respective security-alert of the set of security-alerts; and providing each ordered predefined prompt of the set of predefined prompts to the artificial intelligence model in succession to generate a set of sub-summaries, such that the artificial intelligence model generates a sub-summary of each ordered predefined prompt in succession; and identifying the anomaly associated with the security-event-based time-series based on the generated sub-summaries.

19. The media of claim 18, wherein identifying the anomaly associated with the security-event-based time-series further comprises:

generating an aggregated summary based on aggregating each sub-summary of the set of generated sub-summaries;

providing the aggregated summary to a second artificial intelligence model to generate the summary; and identifying the anomaly associated with the security-event-based time-series based on the summary.

20. The media of claim 16, wherein identifying the anomaly associated with the security-event-based time-series further comprises:

prior to providing a second ordered predefined prompt of the set of predefined prompts to the artificial intelligence model, determining whether a first sub-summary generated by the artificial intelligence model based on a first ordered predefined prompt comprises a first anomaly; and in response to determining that the first sub-summary comprises the first anomaly, identifying the anomaly associated with the security-event-based time-series based on the first anomaly.

* * * * *